United States Patent [19]

Hiyoshi et al.

[11] Patent Number: 4,993,190
[45] Date of Patent: Feb. 19, 1991

[54] POLISHING APPARATUS

[75] Inventors: Toyohiko Hiyoshi, Ushiku; Mikio Iwata, Ibaraki; Kazuo Watanabe, Ushiku; Shinkichi Ohkawa, Tsuchiura; Masanori Suzuki, Ushiku, all of Japan

[73] Assignee: Canon Kabushiki Kaisha, Tokyo, Japan

[21] Appl. No.: 535,982

[22] Filed: Jun. 8, 1990

Related U.S. Application Data

[63] Continuation of Ser. No. 169,429, Mar. 17, 1988, abandoned.

[51] Int. Cl.⁵ .................................. B24B 21/02
[52] U.S. Cl. ........................ 51/145 T; 51/145 R; 51/142; 51/144
[58] Field of Search ............ 51/135 R, 135 BT, 140, 51/141, 143, 144, 145 R, 145 T, 146, 142, 154, 152

[56] References Cited

U.S. PATENT DOCUMENTS

| | | | |
|---|---|---|---|
| 3,564,776 | 2/1971 | Aspden | 51/55 |
| 3,566,544 | 3/1971 | Aspden | 51/55 |
| 3,587,195 | 6/1971 | Aspden | 51/284 |
| 3,589,078 | 6/1971 | Bala et al. | 51/165 |
| 3,676,960 | 6/1972 | Aspden | 51/165 |
| 3,769,762 | 11/1973 | Mayo | 51/284 |
| 4,075,791 | 2/1978 | Koide | 51/145 R |
| 4,145,846 | 3/1979 | Howland | 51/144 |
| 4,347,689 | 9/1982 | Hammond | 51/145 R |
| 4,488,382 | 12/1984 | Zajac | 51/145 R |
| 4,671,018 | 6/1989 | Ekhoff | 51/145 T |
| 4,736,475 | 4/1988 | Ekhoff | 51/154 |

FOREIGN PATENT DOCUMENTS

| | | |
|---|---|---|
| 181561 | 10/1983 | Japan . |
| 1147 | 1/1984 | Japan . |
| 39510 | 6/1985 | Japan . |

Primary Examiner—Frederick R. Schmidt
Assistant Examiner—Blynn Shideler
Attorney, Agent, or Firm—Fitzpatrick, Cella, Harper & Scinto

[57] ABSTRACT

A polishing apparatus for polishing optical components and mechanical parts requiring a high surface precision, such as lenses and mirrors, by pressing a running tape to such component.

6 Claims, 23 Drawing Sheets

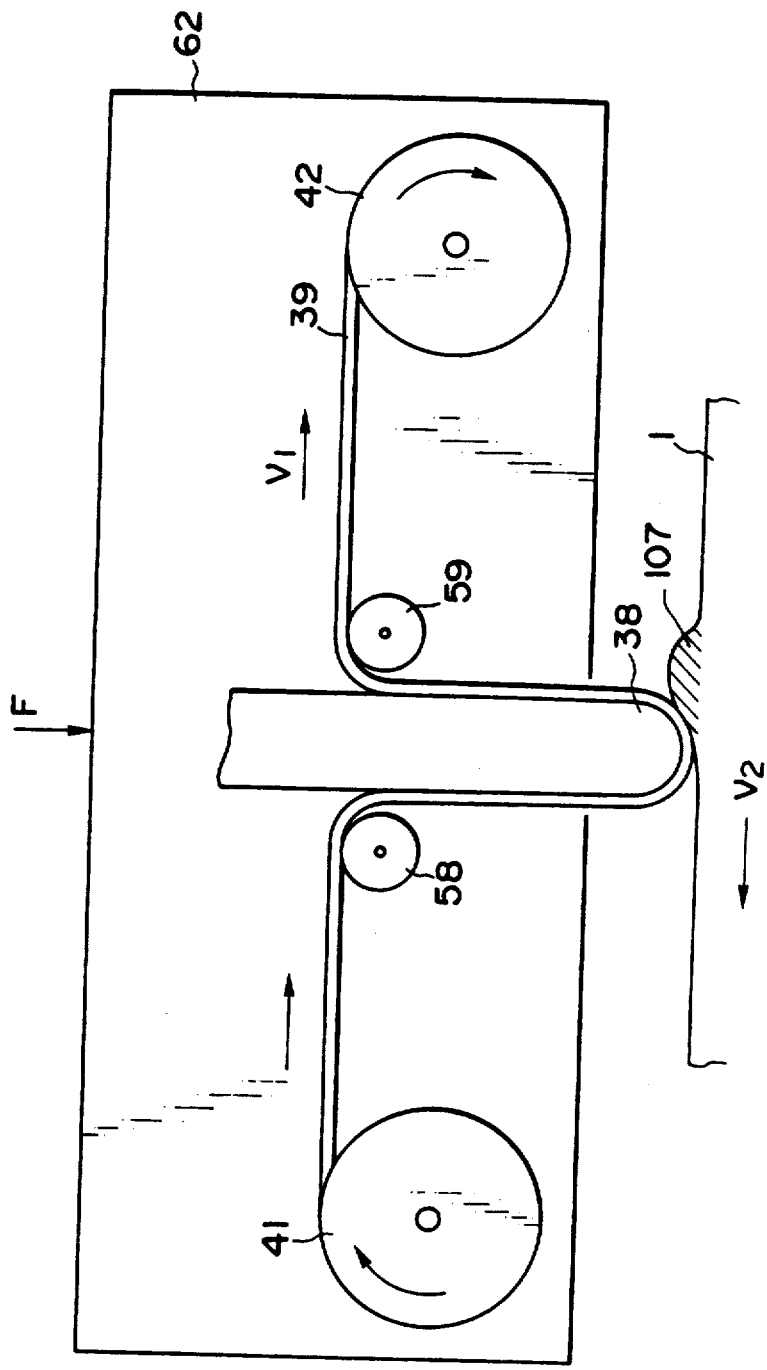

FIG. 27A

DEVIATION FROM SPHERICAL SURFACE (μm)

ERROR

REAL DATA MEASURED VALUE

IDEAL CURVE

Y ERROR (μm)

5μ

ERROR CURVE

CUTTING AMOUNT ON CONSTANT ROTATION SPEED (μm)

1μ

Vo×2 CURVE

CUTTING CURVE (Vo)

ROTATION SPEED ON WORKING

| θ  | $\theta_1 \sim \theta_2 \sim \theta_3 \sim \theta_4 \cdots\cdots\cdots \theta_i \sim \theta_{i+1}\cdots$ |
|----|---------------------------------------------------------------------------------------------------------|
| $v_0$ | $v_1 \quad v_2 \quad v_3 \cdots\cdots\cdots v_i \cdots\cdots$                                        |

FIG.33A    FIG.33B
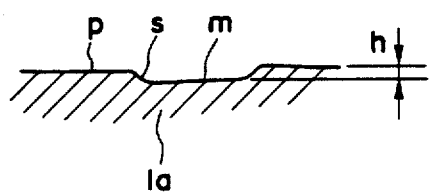
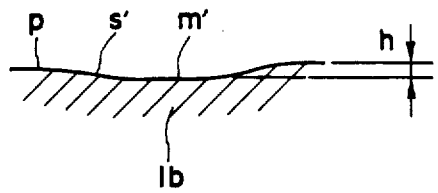
FIG.34A    FIG.34B

POLISHING APPARATUS

This application is a continuation of application Ser. No. 07/169,429 filed Mar. 17, 1988, now abandoned.

BACKGROUND OF THE INVENTION

1. Field of the Invention

The present invention relates to a polishing/grinding apparatus capable of providing high surface precision, and more particularly to a polishing/grinding apparatus in which the polishing operation is achieved by pressing a running polishing tape as the polishing material against the surface to be polished.

2. Related Background Art (1) Optical parts, such as the lens for use in a camera, have spherical and aspherical surfaces and require a highly precise surface coarseness, and also require high dimensional precision with respect to the design values of spherical and aspherical surfaces.

Manufacturing precision can be relatively easy to achieve if the amount of asphericity is small, but, when it becomes large, it is extremely difficult to maintain the desired precision.

When a glass material is given a certain surface coarseness by a preliminary working and certain tool and polishing conditions (polishing material, polishing pressure, polishing speed etc.) are selected, it is known that the amount of abrasion in this system is proportional to the polishing time, and this principle is utilized in the control of work piece and tool in so-called computer controlled polishing. Among such apparatus for computer control of the work piece and tool:

Apparatus in which an aspherical work piece is rotated are disclosed in the U.S. Pat. Nos. 3,566,544, 3,564,776 and 3,769,762;

Apparatus in which a work piece is rotated while a tool is moved in the radial direction are disclosed in the U.S. Pat. Nos. 3,566,544 and 3,564,776; and Apparatus in which a work piece is fixed while a tool scans in the X- and Y-directions are disclosed in the U.S. Pat. Nos. 3,587,195, 3,589,078 and 3,676,960.

(2) The present invention relates to an apparatus for achieving a polishing operation by pressing a polishing tape, supplied from a supply side against a takeup side, to the surface of a work piece to be polished. A prior art device utilizing the polishing tape is disclosed in the Japanese Laid-open Patent 181561/83, which describes a polishing apparatus comprising a shaft capable of supporting a magnetic disk; a pad roller covering with an elastic member a main surface positioned at a side of the magnetic disk supported by said shaft; a polishing tape maintained in contact with said pad roller and rendered movable; and an air bearing positioned corresponding to said pad roller across said magnetic disk and having a rotating portion with an external tube of truncated conical shape; wherein the axis of the rotating portion of said air bearing is so positioned as to substantially cross the rotating portion of said shaft, and said magnetic disk is pinched by said pad roller and the rotating portion of said air bearing, thus maintaining said polishing tape in contact with the magnetic disk rotated by said shaft and thereby polishing the surface of said magnetic disk.

SUMMARY OF THE INVENTION

An object of the present invention is to provide an apparatus capable of preventing the clogging of the polishing material and stabilizing the amount of abrasion, by feeding new polishing material to the surface to be polished of the work piece.

Another object of the present invention is to provide an apparatus capable, in pressing a running polishing tape to the surface to be polished, of controlling the running speed of the polishing tape and the revolution of the work piece, based on the working data, such as the material, shape, surface status, curvature, amount of abrasion etc. of the work piece and the polishing ability of the polishing tape.

Still another object of the present invention is to provide an apparatus capable of polishing a surface with a polishing tape and provided with means for measuring the surface to be polished, thereby enabling partial correction of a portion of said surface requiring correction.

Still another object of the present invention is to provide an apparatus with the above-mentioned measuring means, capable of measuring the work piece without detaching from the apparatus and making a correction, if necessary, according to the result of the measurement.

For this purpose the present invention provides an apparatus in which the measuring means does not directly measure the surface of the work piece to be polished, but measures the amount of abrasion by means of a member for pressing the polishing tape to said surface.

Still another object of the present invention is to provide a polishing apparatus capable of preventing a step or a trace of polishing generated, in a correction polishing, between an already polished area and a correction polished area.

BRIEF DESCRIPTION OF THE DRAWINGS

FIG. 20 is a schematic view showing the working principle of an embodiment;

FIGS. 27A to 27D are charts showing output data characteristics in the embodiment shown in FIG. 26;

FIG. 28 is a chart showing an example of working data shown in FIG. 26;

FIG. 33A and 33B are schematic views showing the polishing function with the rocking device;

FIGS. 34A and 34B are photomicrographs of interference patterns of a polished surface obtained with an interferometer;

DETAILED DESCRIPTION OF THE PREFERRED EMBODIMENTS

A. Entire structure of polishing apparatus

Figure 1:
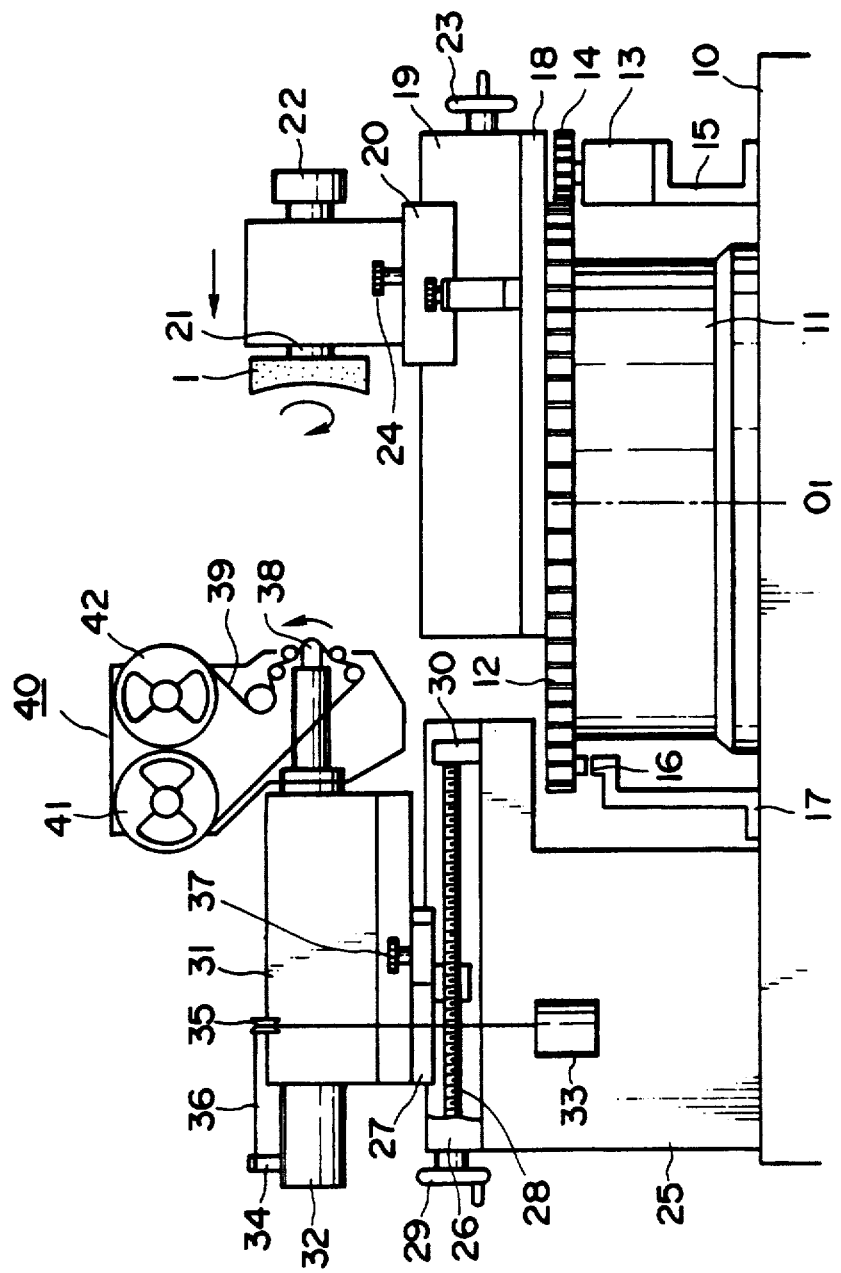
FIG. 1 is an elevation view of a polishing apparatus embodying the present invention.
Figure 2:
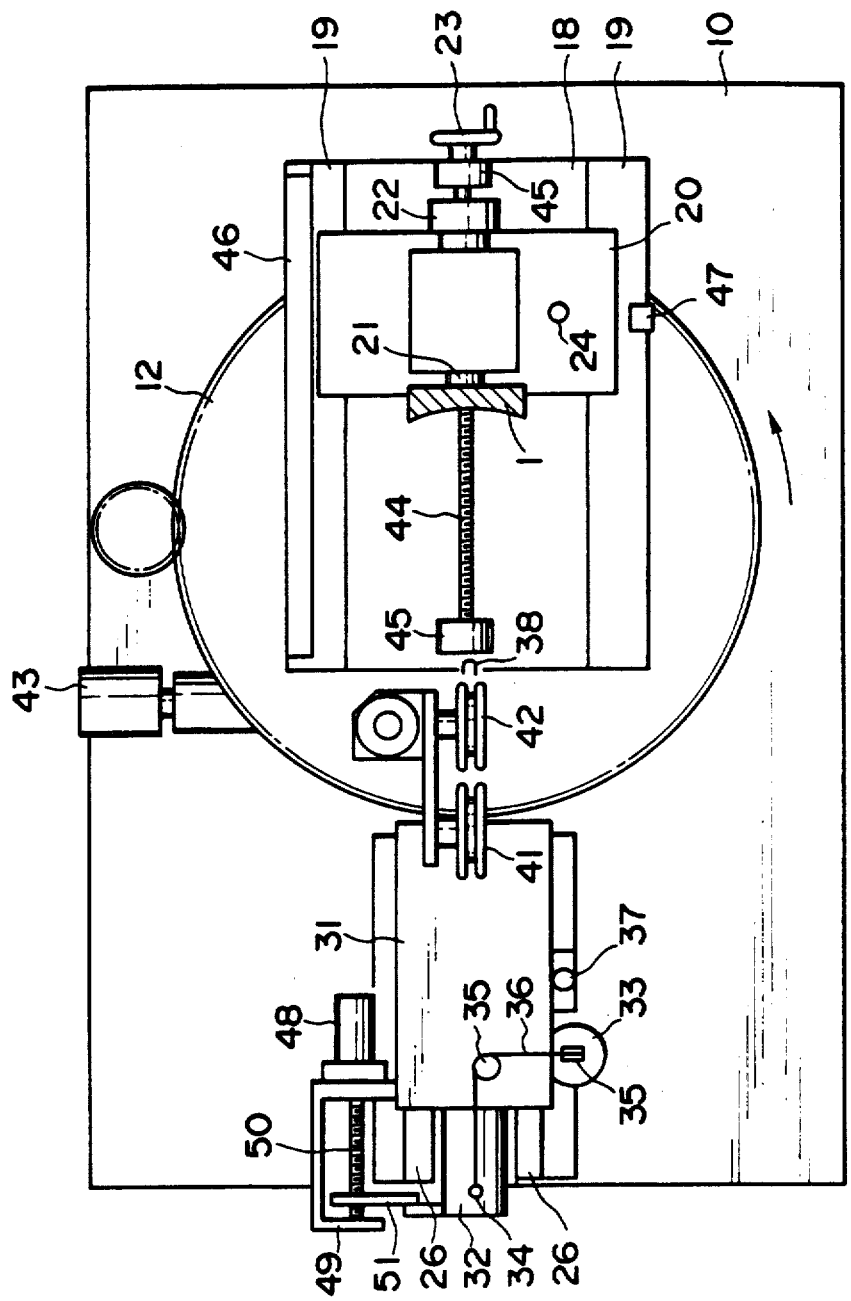
FIG. 2 is a plan view thereof.

FIGS. 1 and 2 illustrate the structure of the entire polishing apparatus, in which are shown a first base member 10 for supporting the entire polishing apparatus; a pivoting table 11 mounted on said first base member 10 so as to be pivotable about an axis $O_1$ by pivoting drive means to be explained later; a large gear 12 mounted on the upper part of said pivoting table 11; an encoder (angle detector) 13 receiving the rotation of the pivoting table 11 through a small gear 14 meshing with said gear 12 and detecting the pivoting angle of said pivoting table 11; a bracket 15 for fixing the encoder 13 on the base member 10; an original point switch 16 for detecting the original point of the pivoting angle of the pivoting table 11; and a pillar 17 for fixing the original point switch 16 on the base member 10.

Also there are shown a second base member 18 for the work piece, fixed on the gear 12 of the pivoting table 11; a linear guide rail 19 fixed on the base member 18; a slider 20 riding and slidable on the linear guide rail 19; a spindle 21 mounted on the slider 20; a work piece driving motor 22 for rotating a work piece 1 mounted on the end of the spindle 21; a work piece feeding handle 23 for moving the slider 20 for making the center of curvature of the work piece 1 coincident with the center of pivoting of the pivoting table 11; and a lock screw for locking the slider 20.

There are further shown a third base member 25 for the tool, fixed on the base member 10; a linear guide rail 26 fixed on said base member 25; a slider 27 riding on said linear guide rail 26; a feed screw 28 for linearly moving the slider 27 in the horizontal direction; a handle 29 connected to said feed screw 28; a bearing 30 supporting said feed screw 28 on the base member 25; a bearing box 31 fixed to the slider 27; an air slide shaft 32 supported by the bearing box 31 and slidable in the horizontal direction; a weight 33 for applying a weight on the slide shaft 32, said weight being attached to the lower end of a wire 36 fixed on a pin 34 provided at the end of the slide shaft 32 and riding on a pulley mounted on the bearing box 31, and being adapted to press the slide shaft 32 toward the work piece 1 with a constant pressure; and a lock screw 37 for locking the slider 27. Said weight 33, wire 36 and pulley 35 constitute pressurizing means for pressing a tape 39 to the work piece.

A pressing member 38 with a spherical end (hereinafter called nose) is mounted at the end of the slide shaft 32 for pressing a lapping tape 39 to the work piece 1. A surface of said lapping tape 39 facing the work piece 1 is uniformly coated with an abrasive material, and small projections remaining on the surface of the work piece 1 can be scraped off and polished to a mirror surface by the movement of said tape 39. A polishing material feed device 40, for feeding the lapping tape 39 between the work piece 1 and the nose 39, is provided with a tape feed reel 41 and a tape takeup reel 42.

Now referring to FIG. 2 showing the entire apparatus seen from above, there are shown a pivoting table driving motor 43 for pivoting the table 11; a feed screw 44 for sliding the slider 27; a handle 29 connected to said feed screw 44; a bearing 45 supporting the feed screw 44; a scale 46 mounted on the base member 25; an original point switch 47 for detecting the original point of the scale 46; a slide shaft driving motor 48 for sliding the slide shaft 32; a motor bracket 49 fixed on the bearing box 31; a feed screw 50, and a stopper 51 mounted on the feed screw 50.

In the above-explained structure, the work piece 1 of various sizes can be detachably mounted on the spindle 21. At the start of polishing operation, the operator rotates the handle 23 at the right hand side to move the slider 20 to a position matching the size of the work piece 1 while reading the value of the scale 46, and fixes the slider 20 by tightening the lock screw 24. Then the operator rotates the handle 29 at the left hand side to move the slider 27 in such a manner that the nose 38, mounted on the polishing material feeding device 40, comes close to the work piece 1, and fixes the slider 27 by tightening the lock screw 37.

Then, in response to the actuation of an unrepresented start button by the operator, the motor 46 is activated to rotate the feed screw 50, thereby sliding the slide shaft 32 toward the work piece 1. The movement of the slide shaft 32 can be controlled with high precision by employing a pneumatic static bearing in the bearing box 31. In this manner the nose 30, mounted on the polishing material feeding device 40 fixed on the slide shaft 32, is brought into contact with the work piece 1, with the lapping tape 39 therebetween. In this state, the surface of the lapping tape, bearing the coated abrasive material, is brought into contact with the work piece 1. The nose 38 is pressed to the work piece 1 with a predetermined pressure as the weight 33 functions on the slide shaft 32.

Subsequently the motor 22 is activated to rotate the work piece 1, and simultaneously the lapping tape 39 is advanced approximately vertically along the curved surface at the end of the nose 38 by a driving motor to be explained later, whereby a polishing operation is conducted by the abrasive material on the lapping tape 39, only the contact area of the nose 38 and the work piece 1.

The amount abraded by the lapping tape 39 depends on the pressure of the nose 38 on the work piece 1, duration of said pressure, revolution of the work piece 1, running speed of the lapping tape 39 and the type of abrasive material coated on the lapping tape 39. The pressure F of the nose 38 on the work piece 1 can be regulated by the amount W of the weight 33. Also the duration T of pressure during which the nose 38 remains in contact with a certain angular position of the work piece 1 across the lapping tape 39 can be regulated by varying the speed of the motor 43. For local polishing of the work piece 1, the motor 43 is activated to pivot the pivoting table 11 at a relatively high speed to an angular position where a portion to be polished of the work piece 1 comes into contact with the work piece 1. Said pivoting angle is read by the encoder 13. The pivoting can be controlled with high precision by employing a pneumatic static bearing for the pivoting table 11.

B. Structure of polishing material feeding device

Figure 3:
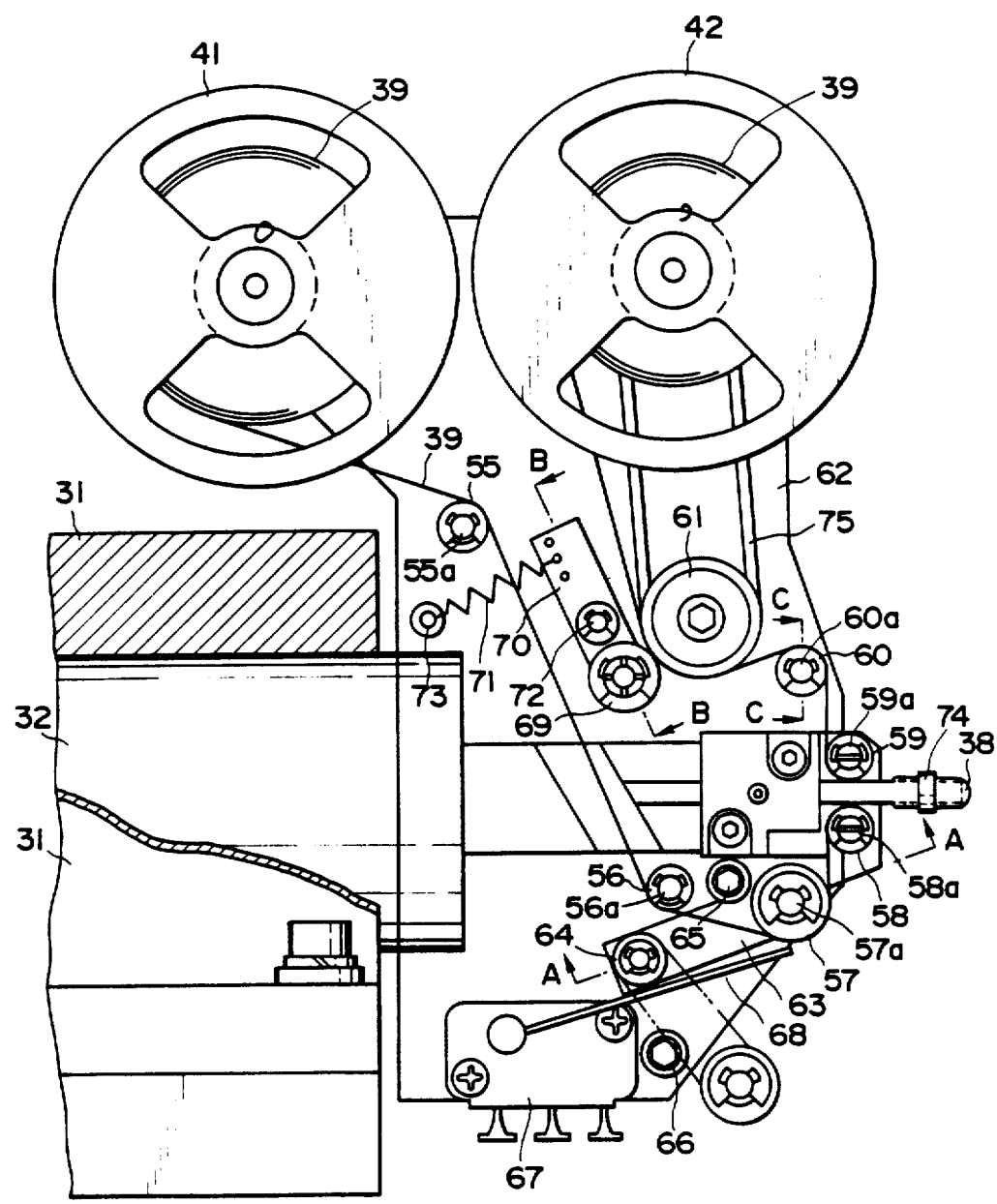
FIG. 3 is an elevation view of a polishing material feeding device in FIG. 1.
Figure 4:
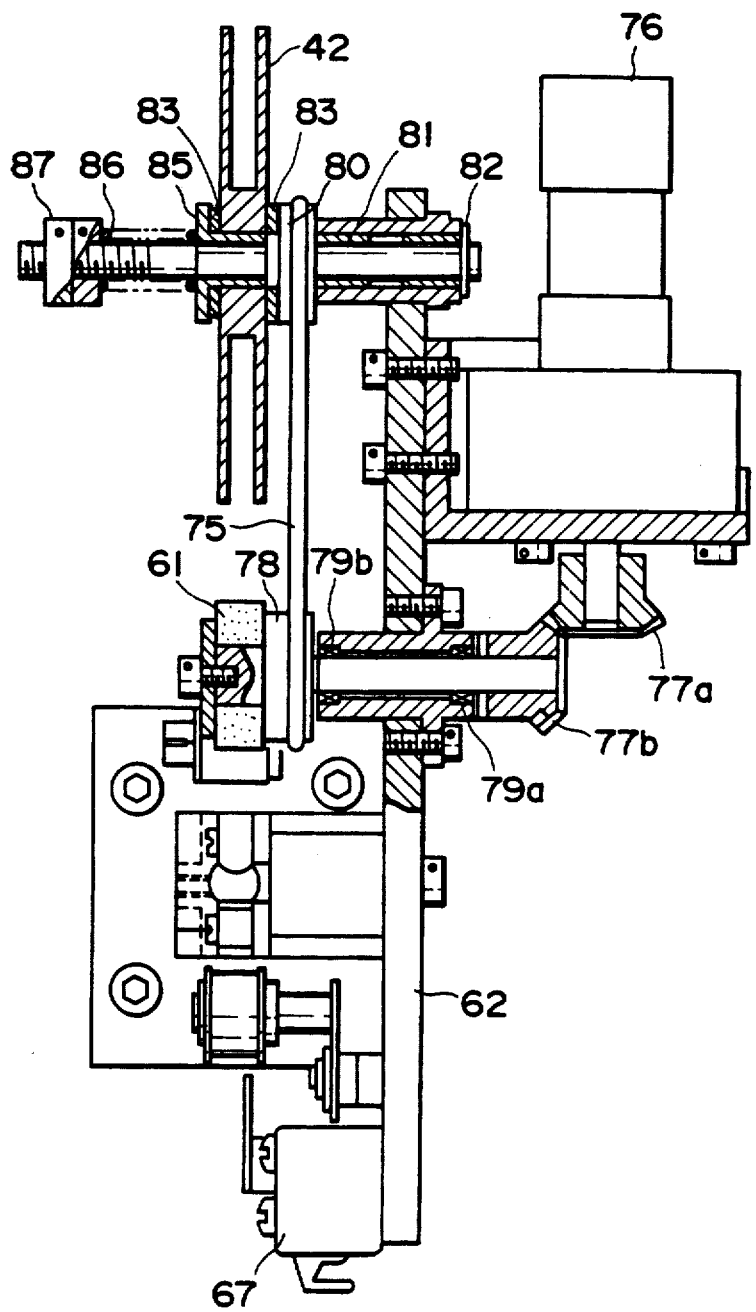
FIG. 4 is a lateral view thereof seen from right.
Figure 5:
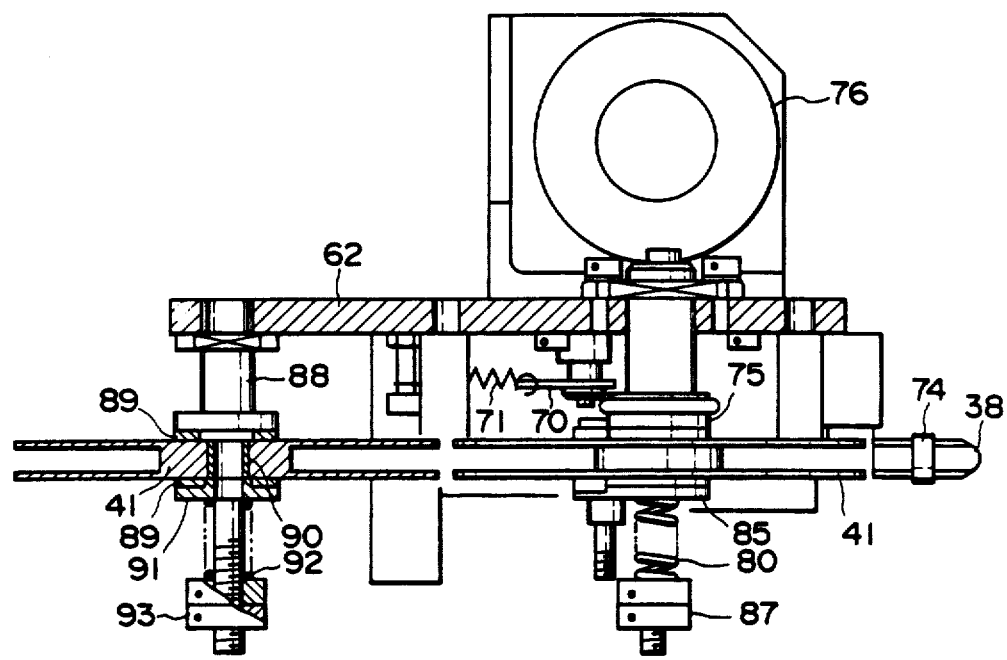
FIG. 5 is a front view thereof.
Figure 6:
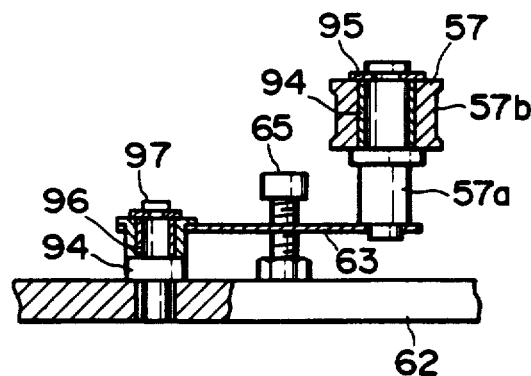
FIG. 6 is a cross-sectional view along a line A—A in FIG. 3.
Figure 7:
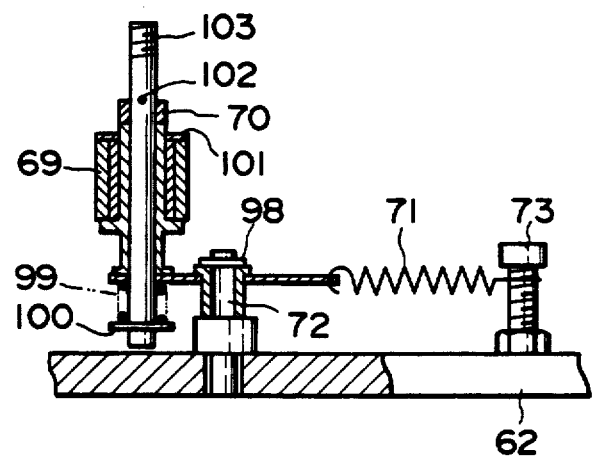
FIG. 7 is a cross-sectional view along a line B—B in FIG. 3.
Figure 8:
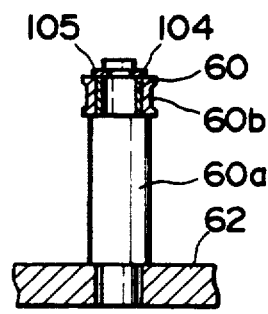
FIG. 8 is a cross-sectional view along a line C—C in FIG. 3.

FIGS. 3 to 8 illustrate an embodiment of the polishing material feeding device 40 of the present invention, wherein FIG. 3 is an elevation view; FIG. 4 is a lateral view seen from right; FIG. 5 is a plan view; FIG. 6 is a cross-sectional view along a line A—A in FIG. 3; FIG. 7 is a cross-sectional view along a line B—B in FIG. 3; and FIG. 8 is a cross-sectional view along a line C—C in FIG. 3.

Referring to FIG. 3, the lapping tape 39 fed from the feeding reel 41 is guided through guide rollers 55-60 and a driven rubber wheel 61 and finally wound on the takeup reel 42. The guide rollers 55, 56, 58 and 60 are rotatably fixed on a bracket 62 by roller shafts 55a, 56a, 58a, 60a, while the roller 57 is rendered movable by the weight thereof, from a solid-lined position to a broken-lined position, by an arm 63 movable about a shaft 64, and the moving range is limited by upper and lower stoppers 65, 66. When the remaining amount of the lapping tape 39 on the feed reel 41 becomes small or when the lapping tape 39 is derailed from one of the guide rollers, the tension of the lapping tape 39 is lowered, whereby the guide roller 57 descends by the weight thereof and a microswitch 67 detects the descent of said roller 57 by means of a detecting rod 68.

There are also shown a tension roller 69 for giving an appropriate tension to the lapping tape 39; a tension arm 70 supporting the tension roller 69; a tension spring 71 pulling the tension arm 70; a shaft 72 for rotatably supporting the tension arm 70; and a support shaft 73 for the tension spring 71. Under the biasing force of the tension spring 71, the tension arm 70 presses the tension roller 69 to the rubber wheel 61, thereby giving an appropriate tension to the lapping tape 39 running therebetween.

A sleeve 74 is provided for preventing the derailing of the lapping tape 39 from the nose 38. The lapping tape 39 runs under said sleeve 74, then reverses at the end of the nose 38, again passes under the sleeve 74 and reaches the guide roller 58. A belt 75 is provided for transmitting rotation to the takeup reel 42.

Referring to FIG. 4, there are shown a reel driving motor 76 for driving the takeup reel 42 and the rubber wheel 61; bevel gears 77a, 77b for transmitting the rotation of the driving motor 76 to a pulley shaft 78, bearings 79a, 79b for the pulley shaft 78 on which said rubber wheel 61 is mounted; a driven pulley shaft 80 receiving the rotation from the driving pulley shaft 78 through a belt 75; a bearing 81 for the pulley shaft 80; a stop ring 82 for the pulley shaft 80; thrust washers 83 positioned on both sides of the takeup reel 42; a bearing 84 for the takeup reel 42; a stop member 85 for the takeup reel 42; a compression spring 86; and a stop screw for fixing the takeup reel 42 on the pulley shaft 80 across the compression spring 86.

Now referring to FIG. 5, a support shaft 86 for the feed reel 42 is fixed on the bracket 62. Components 89-93 serve for the mounting and detaching of the feed reel 42, in which there are provided a thrust washer 89; a bearing 90; a stop member 91; a compression spring 92 and a stop screw 93.

FIG. 6 shows the structure around the arm 63, wherein shown are a bearing 94 provided on a roller shaft 57a of the guide roller 57; a stop ring 95 for retaining the guide roller 57; a guide groove 57b formed on the periphery of the guide roller 57 for guiding the lapping tape 39; and a bearing 96 for rotatably supporting the arm 63, on which the guide roller 57 is mounted. Said bearing 96 is mounted on the shaft 64 and is maintained in position by a stop ring 97.

FIG. 7 shows the structure around the tension arm 70, wherein shown are a stop ring 98 mounted on the shaft 72; a compression spring 99 mounted on the tension arm 70; a stop ring 100 for the compression spring 99; a stop ring 101 for the tension roller 69; a stop pin 102 for the tension roller 69; and a stopper shaft 103.

FIG. 8 shows the structure around the guide roller 60, wherein shown are a bearing 104 for the guide roller 60; a stop ring 105 for maintaining the guide roller 60 rotatably on the bracket 62 by means of the roller shaft 60a; and a guide groove 60b formed on the periphery of the guide roller 60 for guiding the lapping tape 39. Other fixed guide rollers 55, 56, 58, 59 shown in FIG. 3 have a substantially same structure as that of the guide roller 60 shown in FIG. 8.

In the polishing material feeding device 40, as shown in FIGS. 3 and 4, the bracket 62 is mounted on the slide shaft 32 and moves integrally with the nose 38 by the sliding motion of said slide shaft 32. The lapping tape 39 wound on the feeding reel 42 passes, in succession, through the guide rollers 55, 56, 57, 58, the end of the nose 38 and the guide rollers 59, 60, then pinched by the rubber wheel 61 mounted on the pulley shaft 78 and the tension roller 69, and finally wound on the driven takeup reel 41. The pulley shaft 78 is driven by the motor 76 through the gears 77a, 77b and rotates the rubber wheel 61. The revolution of the motor 76 can be arbitrarily varied to regulate the running speed of the lapping tape 39.

The pulley shaft 78 rotates the pulley shaft 80 through the belt 75, thereby rotating the takeup reel 41 through the friction of the thrust washer 83. Said friction is generated by the biasing force of the compression spring 80 pressed by the stop screw 87, and can be regulated by the position thereof.

The winding speed of the lapping tape 39 on the takeup reel 41 gradually increases with the increased diameter thereon and eventually exceeds the tape driving speed of the rubber wheel 61. Consequently the pulley shaft 80 and the takeup reel 41 are rendered mutually slidable by the thrust washer 83, thereby maintaining a constant running speed of the lapping tape 39. The pressing force of the tension roller 69 on the rubber wheel 61 is generated by a tension spring 71, and can be regulated by changing the position of the hole on the tension arm 70 for engaging with the tension spring 71.

The nose 38 is provided with a guide groove for guiding the lapping tape 39 as being explained later, and has a spherical end for contacting at a point with the work piece 1, thereby enabling polishing of a very small area. A cylindrical sleeve 74 is fitted on the external periphery of the nose 38, and the lapping tape 39 is maintained on the nose 38 as it is guided through a gap between said sleeve 74 and the upper or lower groove.

The guide roller 57 is mounted on the arm 63 and is supported by the tension of the lapping tape 39. When the lapping tape 39 is completely taken up on the takeup reel 41 and is detached from the feeding reel 42, the tension of the lapping tape 39 drops so that the guide roller 57 is no longer supported and descends to the lowermost position. In response the microswitch 67 is actuated to stop the motor 76, thus, the running motion of the lapping tape 39 is terminated.

On the other hand, as shown in FIG. 5, the feeding reel 42 is braked by the friction of the thrust washer 89, thus, a tension is applied to the lapping tape 39. The friction is generated by the biasing force of the compression spring 92 pressed by the stop screw 93 and can be regulated by the position thereof. In a prolonged pause of the polishing material feeding device 40, the stopper shaft 103 is inserted in a hole provided in the bracket 62 to fix the tension roller 69, thereby separating said tension roller 69 from the rubber wheel 61 (cf. FIG. 7), as the rubber wheel 61 may be deformed and result in unstable running of the lapping tape 39 in the polishing operation if the tension roller 69 is kept in contact with the rubber wheel 61.

C. Structure of nose (polishing tool)

FIGS. 9 to 18 illustrate an example of the structure of the nose 38 of the present embodiment.

Figure 9:
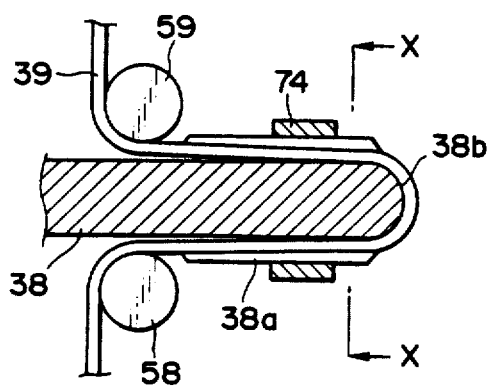
FIG. 9 is a longitudinal cross-sectional view of an example of a nose (polishing tool in FIG. 1)
Figure 10:
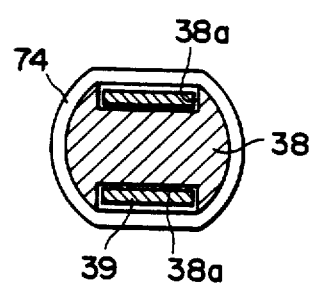
FIG. 10 is a transversal cross-sectional view along a line X—X in FIG. 9.
Figure 11:
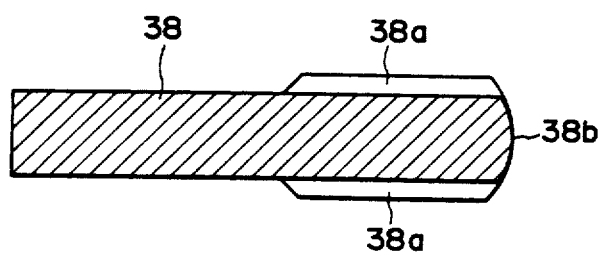
FIG. 11 is a longitudinal cross-sectional view of the nose only in FIG. 9.
Figure 12:
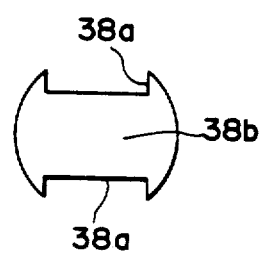
FIG. 12 is a lateral view of the nose in FIG. 11, seen from right.
Figure 13:
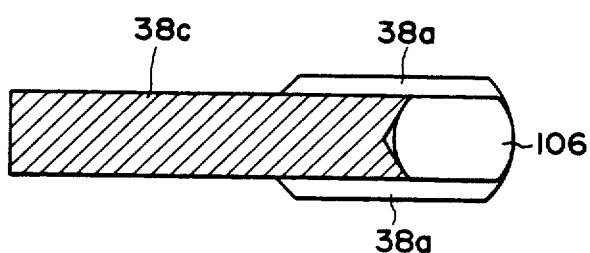
FIG. 13 is a longitudinal cross-sectional view of another embodiment of the nose.
Figure 14:
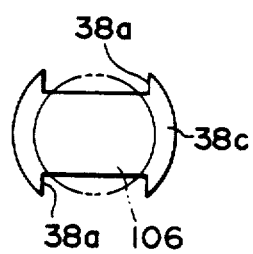
FIG. 14 is a lateral view of the nose shown in $ FIG. 13, seen from right.
Figure 15:
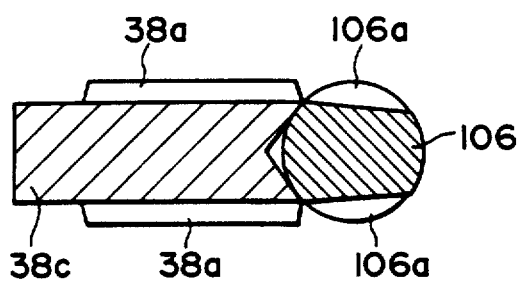
FIG. 15 is a longitudinal cross-sectional view of a variation of the nose.
Figure 16:
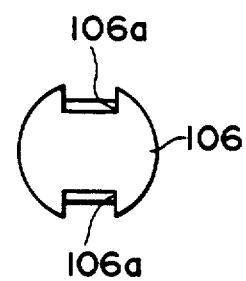
FIG. 16 is a lateral view of the nose shown in FIG. 15, seen from right.

FIG. 9 is a longitudinal cross-sectional view of the nose 38 in the polishing operation; FIG. 10 is a cross-sectional view along a line X—X in FIG. 9; FIG. 11 is a longitudinal cross-sectional view of the nose 38 only; and FIG. 12 is a lateral view thereof seen from the right. In FIGS. 9 to 12, there are shown a tape guide groove 38a formed on the nose 38 along the running direction of the lapping tape 39; and a spherical portion (convex curved surface) 38b at the end of the nose 38. The cylindrical sleeve 74 is fitted on the nose 38 to cover the groove 38a. The lapping tape 39, guided by the guide roller 58, enters a gap between the lower groove 38a of the nose 38 and the sleeve 74, then passes the exposed spherical end 38b of the nose 38, again enters a gap between the upper groove 38b and the sleeve 74 and is guided to the guide roller 59. Since the groove 38a is covered by the sleeve 74, the lapping tape 39 is correctly guided and is not derailed. Also the end of the nose 38, being formed spherical, contacts with the work piece 1 only at a point, thus enabling polishing of a very small area of the work piece 1.

The end of the nose 38 is required to have a highly precise form for applying the pressure to a correct polishing position, and, in the present embodiment, there is required a highly precise spherical form. However, in an integrally structured nose 38 as shown in FIGS. 9–12, a highly precise spherical surface is difficult to obtain due to the difficulty of formation of the spherical surface 38b.

Figure 17:
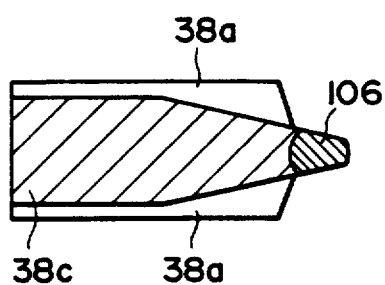
FIG. 17 is a longitudinal cross-sectional view of still another embodiment of the nose.
Figure 18:
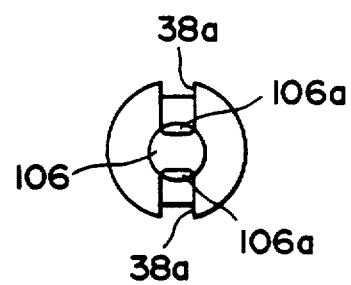
FIG. 18 is a lateral view of the nose shown in FIG. 17, seen from right.

FIGS. 13 to 18 illustrate another embodiment in which a highly precise spherical surface is obtained by attaching a steel ball 106 to the end of the nose 38. The steel ball 106 is easily available with a desired precision, and can be composed of a commercially available ball such as a bearing ball. Said steel ball 106 is fixed to the end of the nose 38 for example with an adhesive material, and tape guide grooves 106a are formed on the upper and lower sides of the nose 38 and the ball 106. If the amount of abrasion from the work piece 1 is large, there is preferably employed a relatively large steel ball 106 as shown in FIGS. 13–16, while if said amount is small for example in case of a small work piece, there is preferably employed a relatively small steel ball as shown in FIGS. 17 and 18.

D. Working principle

Figure 19:
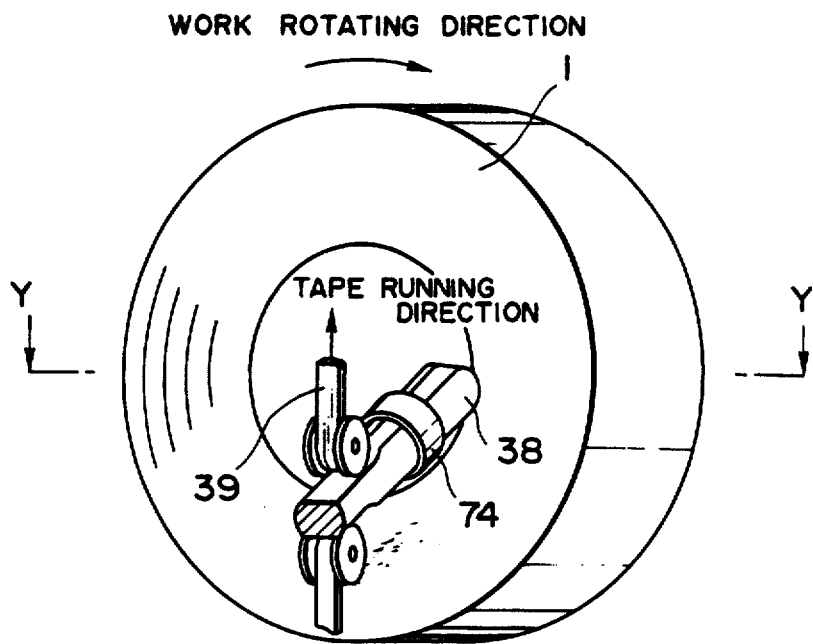
FIG. 19 is a schematic perspective view showing the working principle of an embodiment.

FIGS. 18 to 21 show the working principle of the present embodiment. As shown in FIG. 19, the abrasive bearing surface of the lapping tape 39 is positioned to face the work piece 1, and the end of the nose 38 is pressed, across the lapping tape 39, at a position to be on the work piece 1 to be polished. The work piece 1 is rotated clockwise as indicated by an arrow, while the lapping tape 39 is driven upwards, whereby the portion of the work piece 1 contacted by the nose 38 is polished. The lapping tape 39, having a uniform coating of the abrasive material, can provide a constant amount of abrasion, without the drawback in the conventional floating polishing particles. During the polishing operation, the work piece 1 is always given new abrasive material by the running of the lapping tape 39, so that the clogging of the abrasive material does not occur. Also it is rendered possible to stabilize the amount of polishing and to obtain a mirror finish with high precision, since the work piece is always polished with the ideal abrasive material. Also the rotational vibration of the tool does not occur as the tool itself is not rotated. Besides, since the end of the nose 38 is formed as a spherical surface, the nose 38 contacts with the work piece 1 at a point, thereby enabling local polishing of a very small area with a high precision. Furthermore, since the pressure of the nose 38 on the work piece 1 can be regulated by the weight 33, it is rendered possible to polish the work piece 1 with an optimum pressure, thereby stabilizing the amount of polishing.

The amount of abrasion by the lapping tape 39 is determined, as already explained before, by the revolution of the work piece 1, running speed of the lapping tape 39, type of the abrasive material coated on the tape 39, and pressure and pressing period of the nose 38 on the work piece 1.

Figure 21:
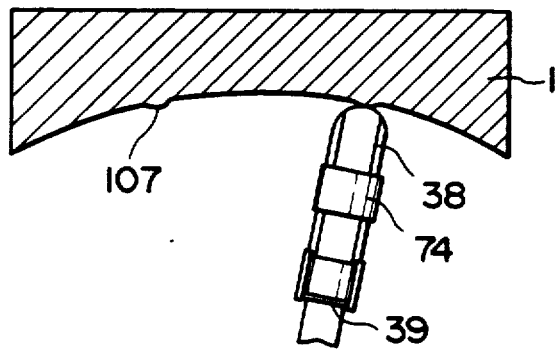
FIG. 21 is a cross-sectional view along a line Y—Y in FIG. 19.

Consequently, as shown in FIG. 20, if the work piece 1 is rotated at a constant speed $V_2$ while the lapping tape 39 is fed at a constant speed $V_1$ and employs a given abrasive material, and the nose 38 applies a constant pressure F by the weight 33 on the work piece 1, mirror finish polishing with high precision can be achieved by controlling the duration of pressing of the nose 38 onto the work piece 1 for suitably regulating the amount of abrasion. However in practice the small projections 107 on the work piece 1 vary in size and location as shown in FIG. 21, so that it is necessary to measure the position and size of the projections 107 to be polished in advance, to bring the nose 38 to the measured positions by moving the work piece 1 and to regulate the pressing period according to the size of the projections 107. The movement of the work piece 1 can be achieved by controlling the pivoting angle of the table 11 with the motor 43, and the pressing period can be regulated by controlling the pivoting speed of the table 11. It is experimentally confirmed that the above-mentioned amount of abrasion is inversely proportional to the pivoting speed.

E. Structure of the control unit

Figure 22:
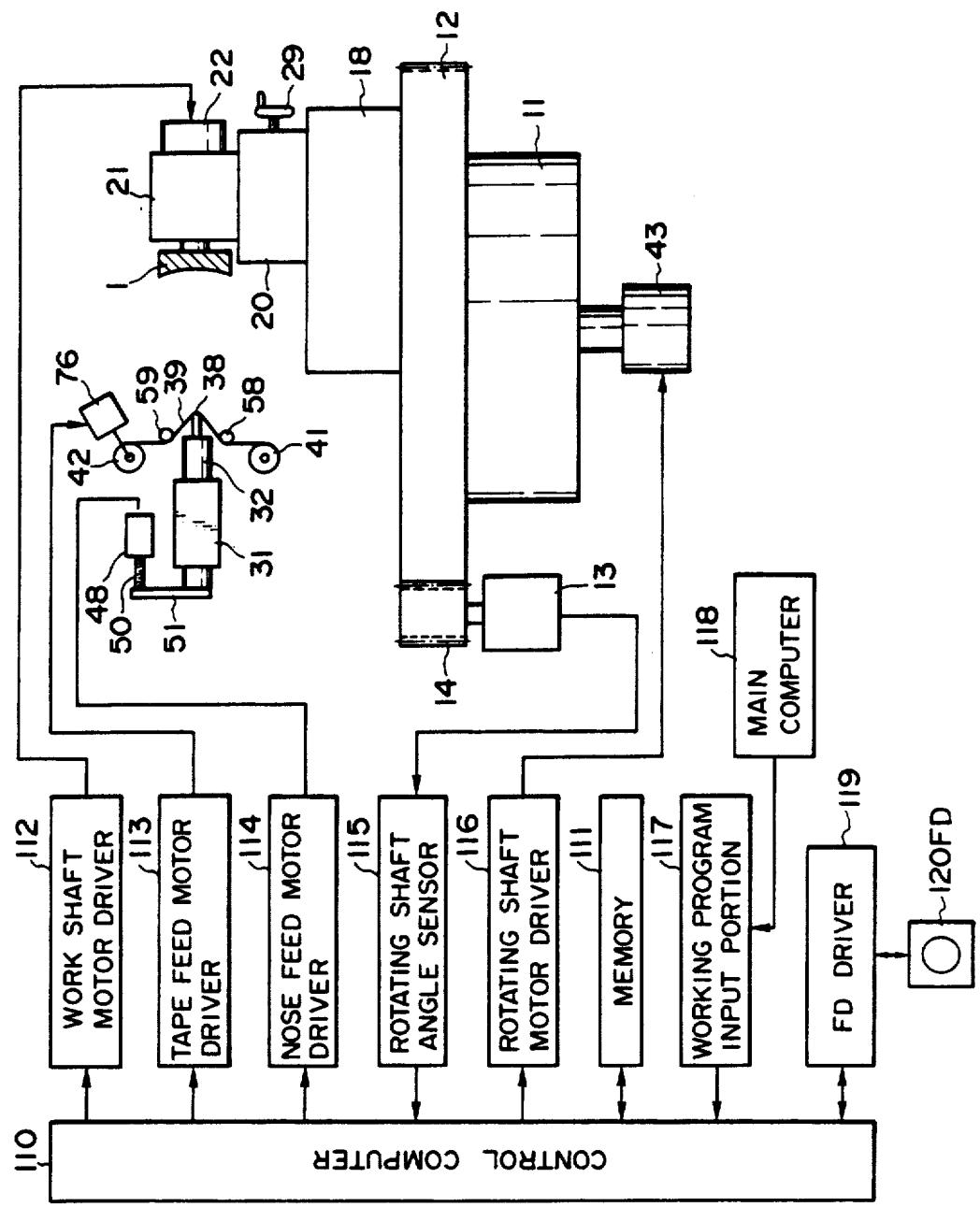
FIG. 22 is a block diagram showing an example of a control system of an embodiment.
Figure 23:
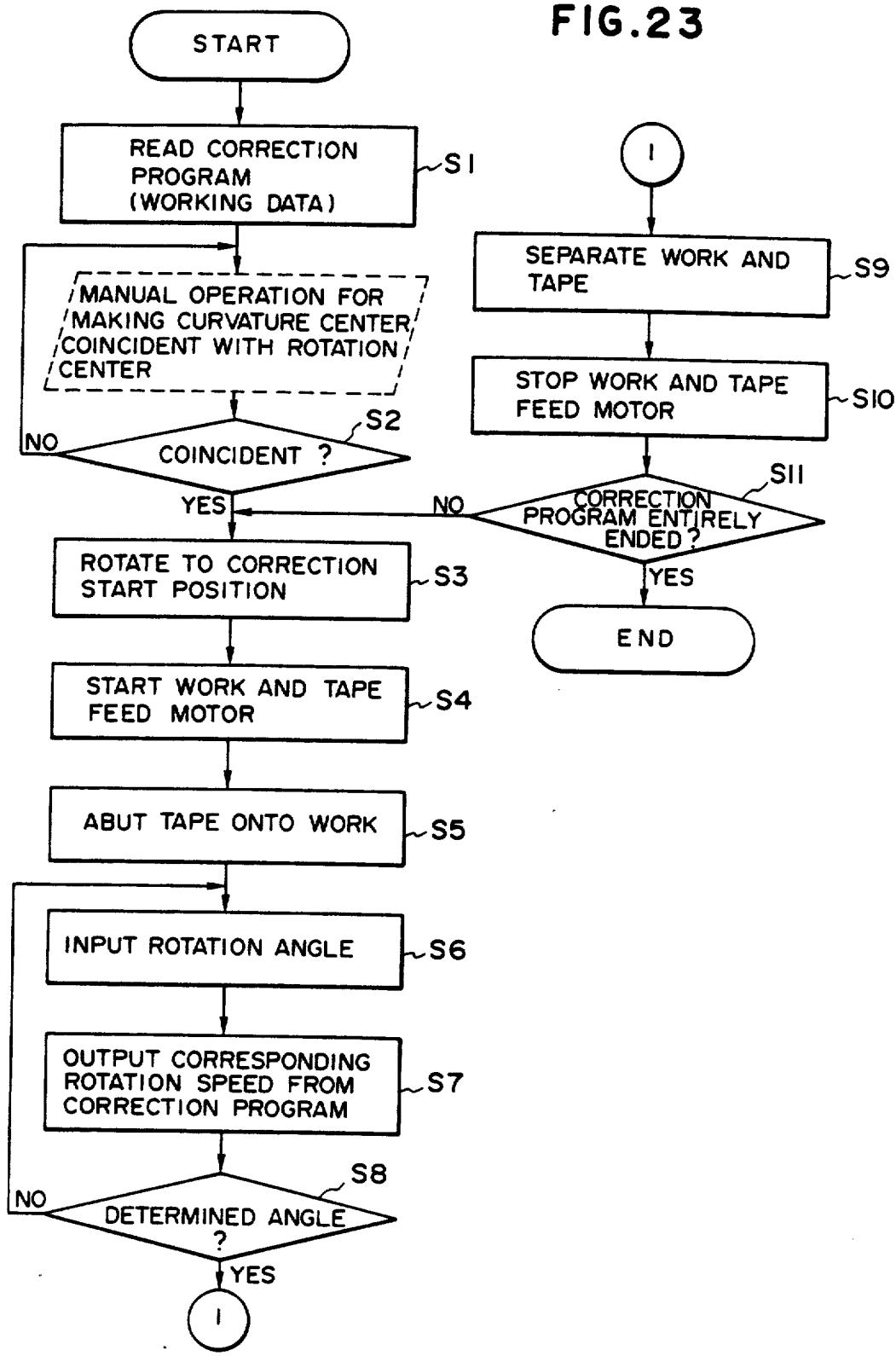
FIG. 23 is a flow chart showing an example of control sequence in the polishing operation of an embodiment.

FIG. 22 shows an example of the control system for use in the present embodiment, wherein shown are a controlling computer 110 for controlling the polishing operation of the present invention according to a control sequence, as shown in FIG. 23, stored in a memory 111; a work shaft motor driver 112 for controlling the motor 22 for rotating the work piece 1; a tape feed motor driver 113 for controlling the motor 76 for feeding the lapping tape 39; and a nose feed motor driver 114 for controlling the motor 48 for moving the nose 38 by means of the slide shaft 32. These motor drivers 112-114 control the corresponding motors in response to instruction signals from the computer 110. A pivoting angle detector 115 receives the output signal from the encoder 13 for detecting the pivoting angle of the table 11, and sends a pivoting angle signal to the computer 110. A pivoting motor driver 116 controls the motor 43 for pivoting the table 11.

A program input unit 117 is provided for receiving a work program, as will be explained later, from a main computer 118, wherein said work program consists of data indicating the pivoting angle and pivoting speed of the pivoting table 11. A floppy disk driver 119 controls a floppy disk 120.

Now reference is made to a flow chart shown in FIG. 23 for explaining an example of the control operation of the present embodiment.

At first, prior to the start of partial correction of the work piece 1, the computer 110 receives a correction program (work program) from the program input unit 117, and stores said program in a predetermined area of the memory 111 (step S1). Then the operator rotates the handle 29 to bring the center of curvature of the work piece 1 to the center of the pivoting table. When the computer 110 confirms the coincidence of said centers (step S2), the computer 110 activates the motor 43 through the motor driver 116 according to the correction program stored in the memory 111, thereby pivoting the table 11 to a portion to be corrected of the work piece (step S3).

Subsequently the computer 110 activates the motor 22 through the motor driver 112 to rotate the work piece 1, and activates the motor 76 through the tape feed motor driver 113, thereby feeding the lapping tape 39 (step S4).

Then the computer 110 activates the motor 48 through the nose feed motor driver 114, thereby bringing the nose 38 to a state in contact, across the lapping tape 39, with the work piece 1 (step S5). Then the computer 110 activates the motor 43 by sending a pivoting speed signal to the motor driver 116 according to the correction program stored in the memory 111, and receives the pivoting angle data from the encoder 13 through the detector 115 (step S6).

Subsequently the computer 110 sends, according to the correction program stored in the memory 111, a pivoting speed, corresponding to the detected pivoting angle, to the motor driver 116, thereby controlling the pivoting speed of the motor 43 (step S7). The foregoing control operations of the steps S6, S7 are repeated until the detected value from the encoder 13 reaches a predetermined end angle stored in the correction program, and, when said end angle is reached (step S8), the computer 110 activates the motor 48 through the motor driver 114 to separate the lapping tape 39 from the work piece 1 (step S9) and activates the motors 22, 76 through the motor driver 113 thereby completing the correction polishing of an area (step S10).

If the correction program is not yet completed, namely if other portions of the work piece 1 are to be correction polished, the sequence returns to the step S3 and the above-explained steps S3 to S10 are repeated until the correction program is completely finished (step S11).

F. Structure of abrasion amount measuring means

Figure 24:
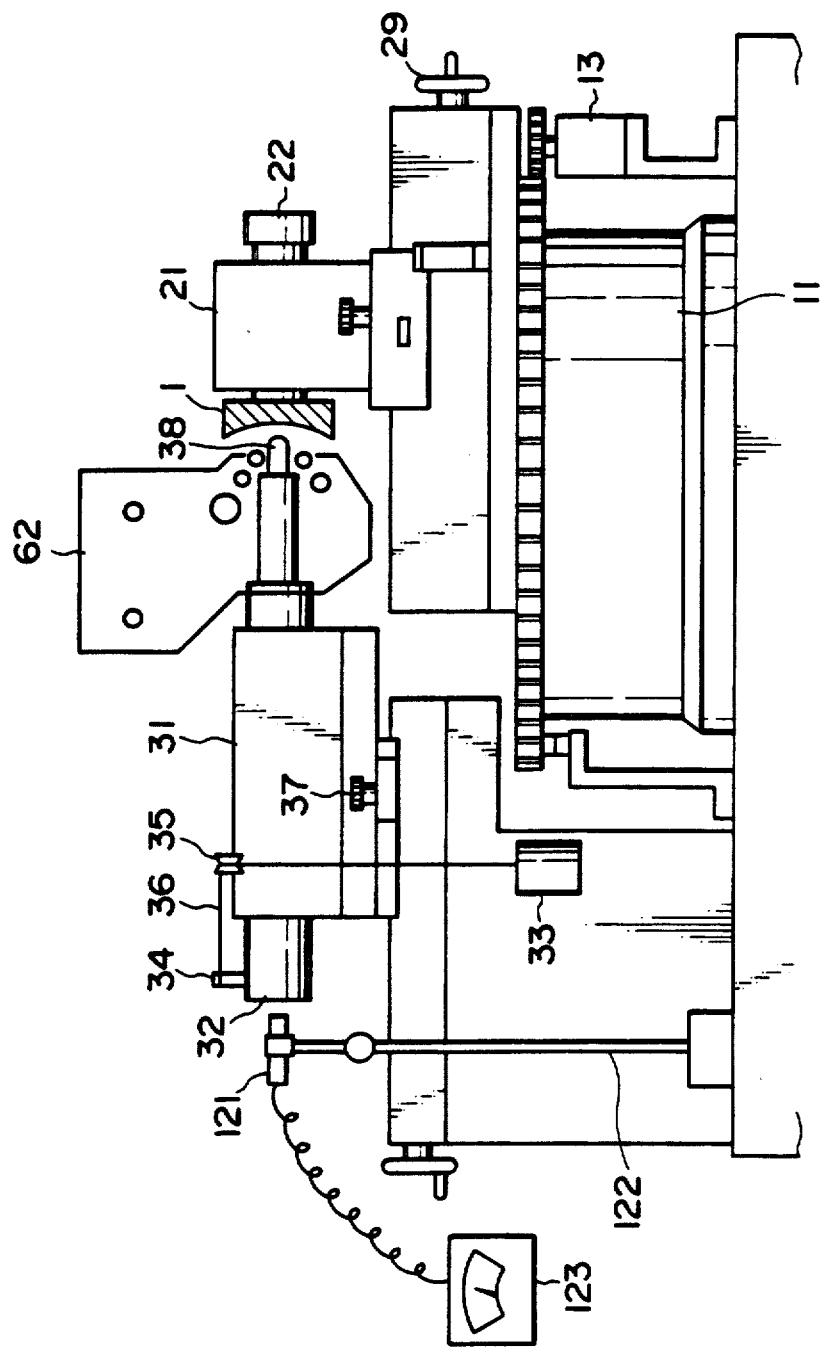
FIG. 24 is an elevation view of an embodiment when the polishing apparatus is used also for measuring of the amount of abrasion.
Figure 25:
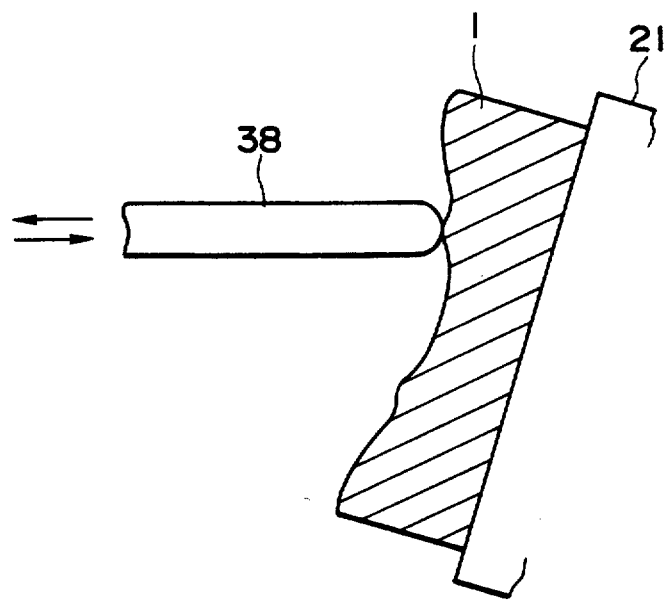
FIG. 25 is a cross-sectional view in the horizontal direction showing the nose in FIG. 24 in the measuring operation.

FIG. 24 shows that the apparatus shown in FIG. 1 can also be used for measuring the amount of abrasion before and after the polishing operation, by providing a non-contact measuring instrument.

In FIG. 24, a non-contact measuring device 121 is composed of a non-contact electric micrometer such as a magnetic scale, a laser distance-measuring scale or an optical scale. Said non-contact measuring device 121 may be mounted at any position as long as it can measure the movement of the slide shaft 32 moving integrally with the nose 38, and, can for example be positioned behind the slide shaft 32 as shown in FIG. 24. There are further provided a positionally regulable stand 122 for fixing said measuring device 121 at the mounting position, and a meter 123 for indicating the amplified output signal of said device 121. The measured data from the measuring device 121 are amplified, then converted into digital signal and supplied to the computer 110 shown in FIG. 22. Other components are same as those in FIG. 1 and will not, therefore, be explained in detail.

In the above-explained structure, the lapping tape 39 is removed from the nose 38 for polishing the surface of the work piece 1, and said nose 38 is brought, as a measuring probe, into direct contact with the work piece 1.

After said direct contact is obtained, the pivoting angle of the table 11 is set at the original point, then the bearing box 31 is fixed by the locking screw 37, and the table 11 is pivoted. By pivoting the work piece 1 after the nose 38 is maintained in direct contact therewith, the nose 38, which is pressed to the work piece 1 under a constant pressure exerted by the weight 33 through the slide shaft 32, follows the surface form of the work piece 1 and the small surface irregularities thereon, and the slide shaft 32 on which the nose 38 is mounted moves together with the nose 38.

The movement of the slide shaft 32 is measured by the non-contact measuring device 121 at a predetermined pitch and is transmitted to the computer 110. Said computer 110 stores the measurement data from said measuring device 121 and the pivoting angle data of the table 11 from the encoder 13 in the memory 111, then determines the error from the ideal design data of the work piece 1, and prepares correction data consisting of the amounts of correction polishing and the positions thereof.

Particularly the present embodiment shows extremely good following ability and the non-contact measuring device 121 can measure the minute surface irregularities on the work piece 1 with very high precision in the order of 5/100 - 2/100 μm, since the slide shaft 32 is supported by an air bearing in the bearing box 31 and is given an appropriate contact pressure by the weight 33, and the end of the nose 38 is formed as a spherical surface. The present embodiment, in which the pressing member working as a polishing tool can also be utilizes as a measuring probe, dispenses with an expensive exclusive measuring apparatus, also is free from the setting error of the work piece 1, and is capable of a polishing operation immediately after the measurement, thereby significantly reducing the time required for the process. Also the process from the measurement to the correction polishing can be fully automated, thus allowing to significantly reduce the operations required and to reduce the manufacturing cost.

G. Structure of work data preparation means

Figure 26:
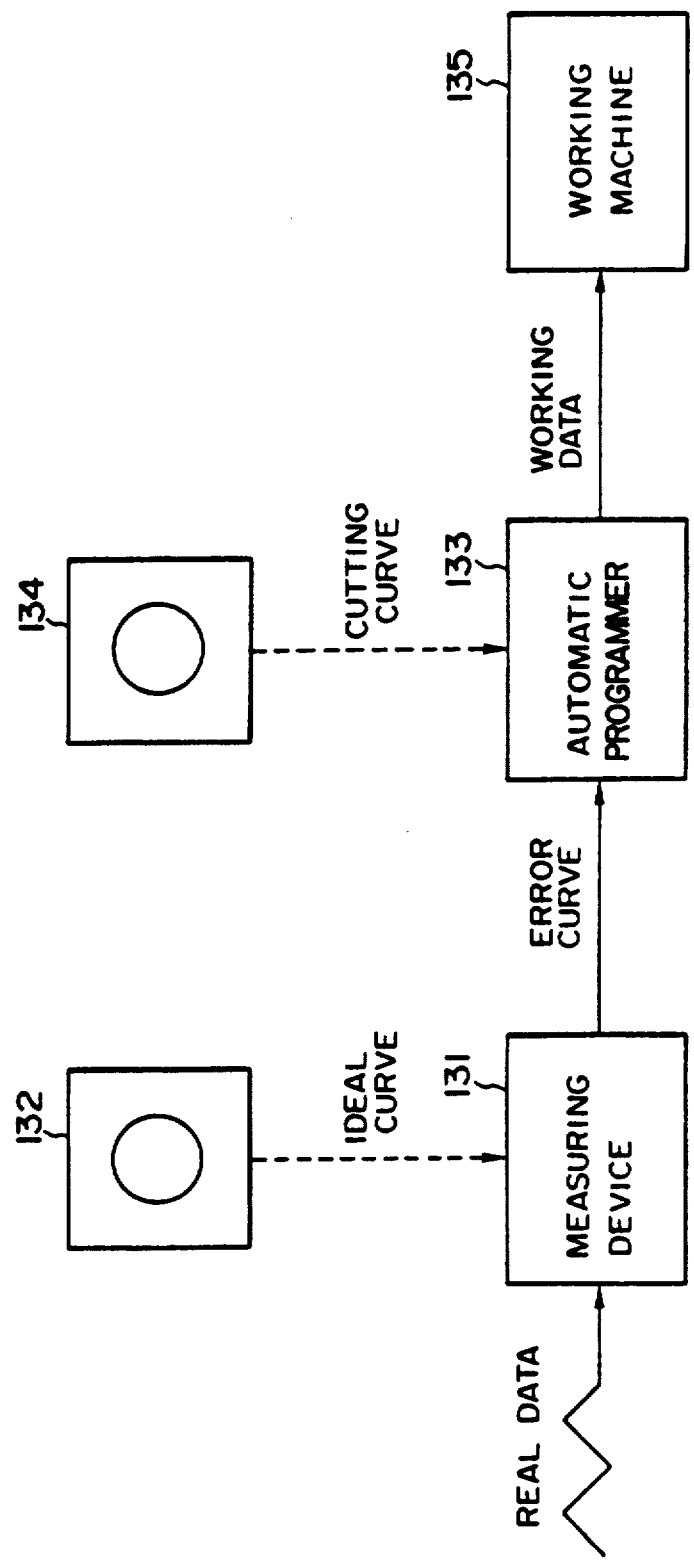
FIG. 26 is a block diagram showing a working data preparation system embodying the present invention.

FIG. 26 shows the structure of work data preparation means for preparing the work data (correction program) for use in the correction polishing apparatus shown in FIG. 1. In FIG. 26 there are provided a measuring device 131 for providing an error curve (data) from the measured data and an ideal curve to be explained later; a floppy disk 132 for providing the measuring device 131 with said ideal curve; an automatic programmer 133 for providing work data from the error curve supplied from said measuring device 131 and a polishing amount curve to be explained later; a floppy disk 134 for providing the automatic programmer 133 with said polishing amount curve; and a polishing apparatus 135 as shown in FIG. 1, for receiving, as the correction program, the work data from the automatic programmer 133 for effecting the correction polishing operation.

Figure 29:
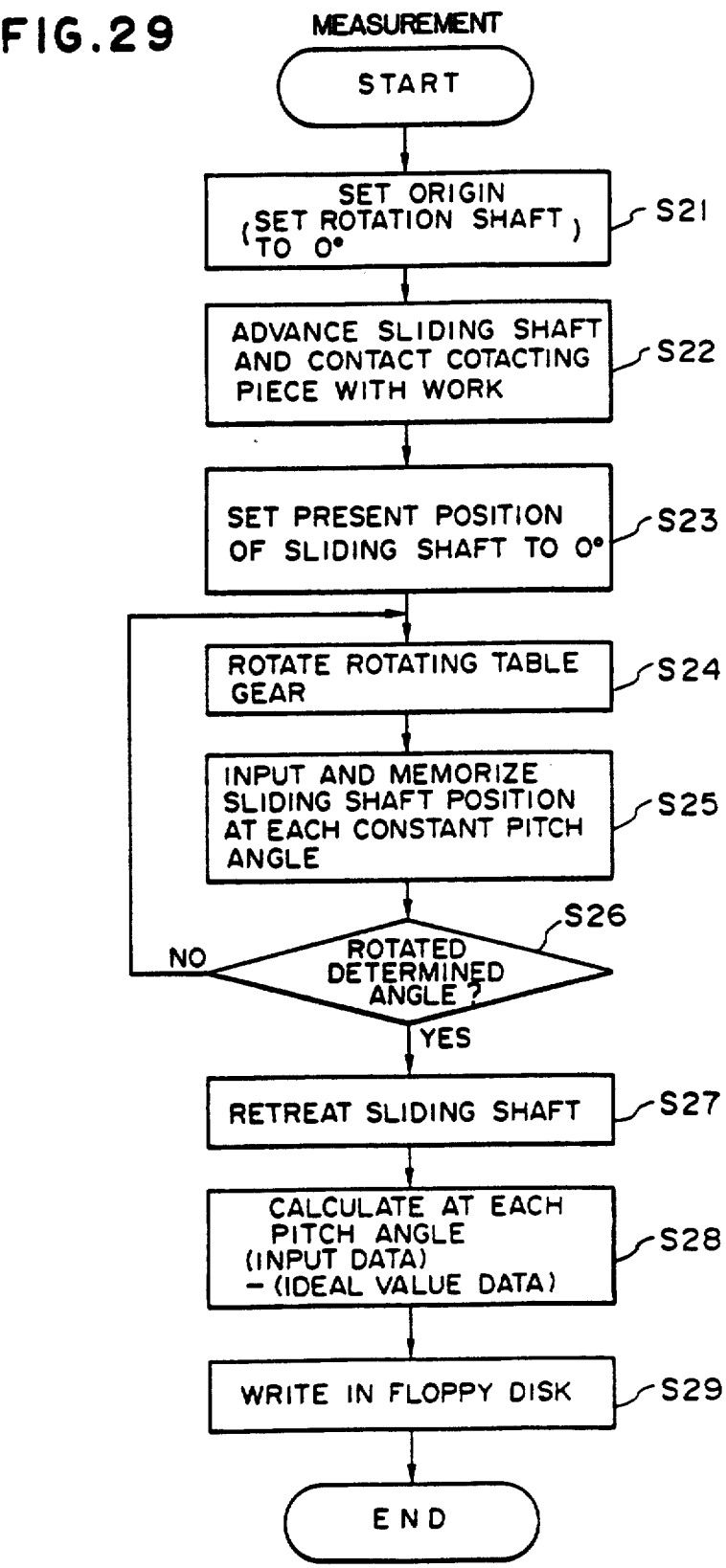
FIG. 29 is a flow chart showing an example of a function of the measuring device shown in FIG. 26.

The measuring device 131 is composed of movement measuring means such as a non-contact electric micrometer shown in FIG. 24 and calculation control means contained in the computer shown in FIG. 22, and determines an error curve, represented by $\gamma$ and $\theta$ as shown in FIG. 27B, according to a control sequence as shown in FIG. 29 stored in advance in memory means such as the memory 111 shown in FIG. 22, from the pivoting angle $\theta$ shown in FIG. 27A, measured values of the work piece 1 represented by the deviations from the spherical surface thereof, and error $\gamma$ from the ideal design curve stored in the floppy disk 132.

Figure 30:
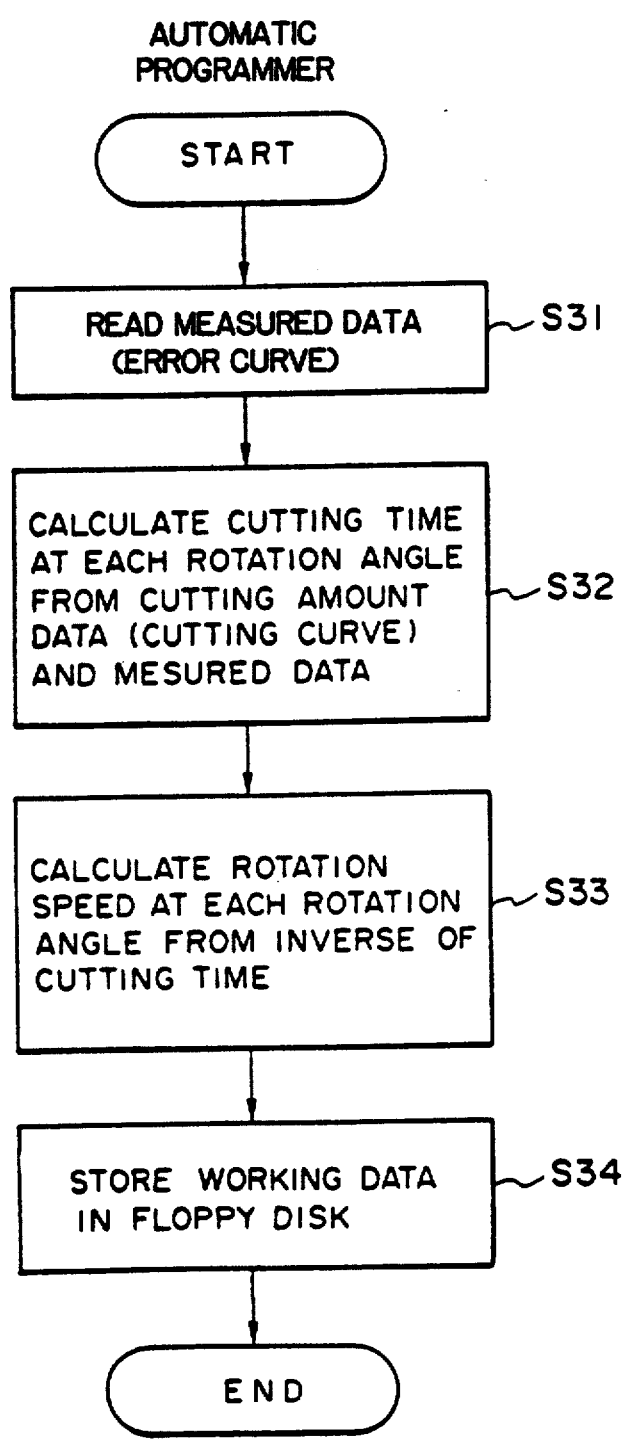
FIG. 30 is a flow chart showing an example of a function of an automatic programmer shown in FIG. 26.

The automatic programmer 133 is for example composed of the calculation means contained in the computer 118 shown in FIG. 22, and determines the work data as shown in FIG. 27D, according to a control sequence as shown in FIG. 30, from the error curve as shown in FIG. 27B from the measuring device 131, and the polishing amount curve as shown in FIG. 27C stored in the floppy disk 134.

FIG. 27C shows a polishing amount curve representing the relationship between the pivoting angle $\theta$ and the amount of polishing when the pivoting table 11 is pivoted at a constant speed. The nose 38 is positioned close to the center of the rotating work piece 1 when the pivoting angle $\theta$ is close to zero (original point), but it moves toward the external periphery of the work piece 1 with the increase of the pivoting angle $\theta$, so that the circumferential speed of the rotating work piece 1 becomes lower toward the center. Thus FIG. 27C indicates that the amount of polishing decreases with the increase of the pivoting angle $\theta$ if the pivoting speed is constant. Also the amount of polishing decreases or increases respectively when the pivoting speed becomes faster or slower, so that the amount of polishing is inversely proportional to the pivoting speed as represented by a broken line in FIG. 27C.

Thus the automatic programmer 133 compares the error curve and the polishing amount curve at a predetermined pitch of pivoting angle, and calculates the pivoting speed at each pivoting angle in the correction polishing. For example, if the error is 5 μm for a pivoting angle $\theta$; and the amount of polishing is 1 μm at a constant pivoting speed $V_0$, the pivoting speed V at the polishing operation is given by $V=V_0/5$. In practice, the portions to be correction polished are randomly distributed on the work piece 1, so that the work data to be given to the polishing apparatus 135 have a content, as shown in FIG. 28, of instructing to maintain a calculated pivoting speed between certain pivoting angles.

Figure 31:
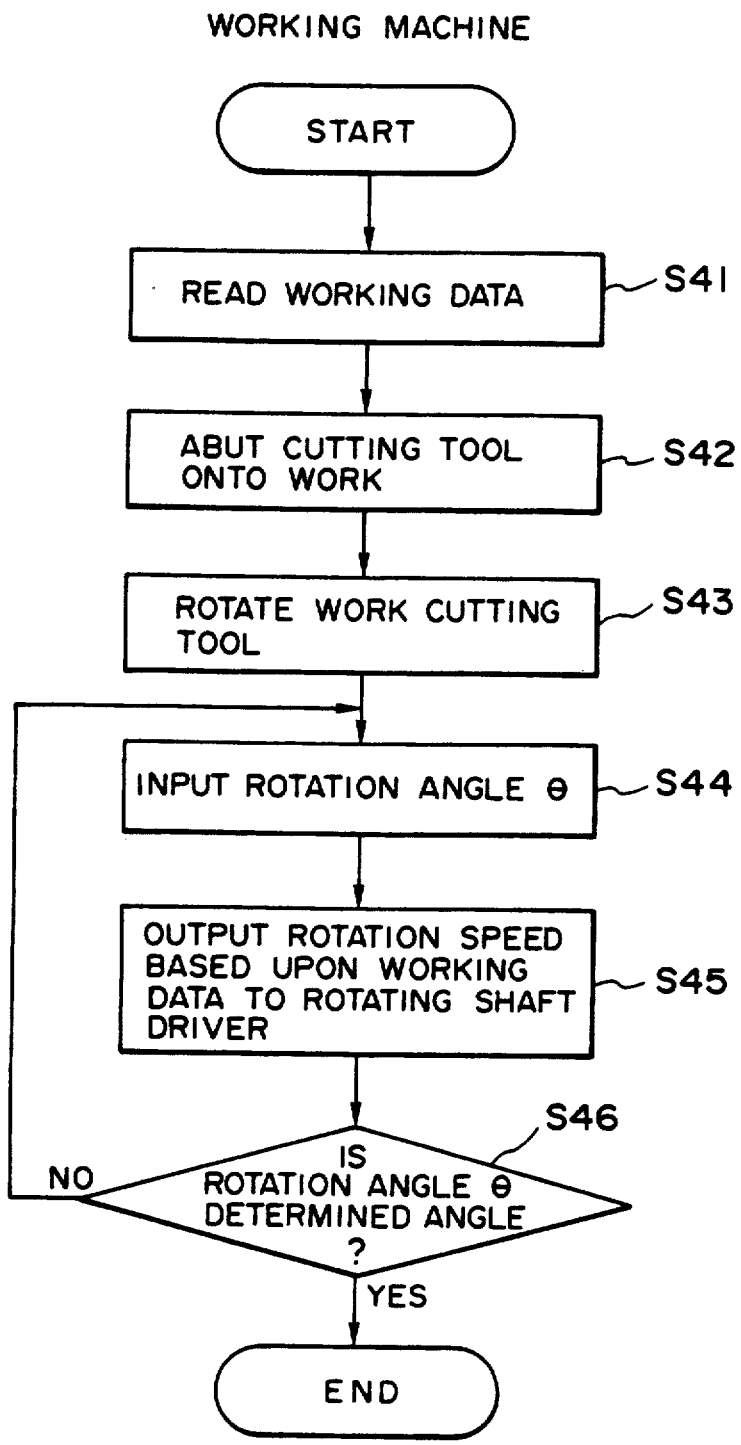
FIG. 31 is a flow chart showing an example of a function of the polishing device shown in FIG. 26.

The polishing apparatus 135 receives the work data as a correction program, and executes a correction polishing of the work piece 1 according to a control sequence shown in FIG. 31, or in FIG. 23.

Now reference is made to a flow chart shown in FIG. 29, for explaining an example of the function of the above-explained measuring device 131.

As shown in FIG. 24, the non-contact measuring device (for example non-contact electric micrometer) 121 is positioned behind the slide shaft 32, then the work piece 1 is mounted on the spindle 21, and the center of curvature of the work piece 1 is brought to the center of pivoting of the table 11 by the handle 29. Then the lapping tape 39 is removed from the nose 38, and the nose 38 is brought close to the work piece 1 by the handle 29, and the bearing box is fixed by the locking screw 37. Also, a suitable contact pressure is selected by the weight 33. After these preparatory operations, the operator depresses a measurement start button on an unrepresented operation console, whereby the control sequence shown in FIG. 29 is started.

At first, in response to the instruction to start measurement, the computer 110 activates the motor 43 through the motor driver 116 to set the pivoting angle of the table 11 at the original point (0°), which is detected by the original point switch 16 (FIG. 1) (step S21).

Then the computer 110 activates the motor 46 through the nose feeding motor driver 114 thereby advancing the slide shaft 32 and bringing the nose 38 (hereinafter called contact probe) into direct contact with the work piece 1 (step S22). Then the computer 110 sets the current position of the slide shaft 32 at zero (step S23), sends a drive signal to the motor driver 116 for rotating the table 11 and the gear 12 thereof at a constant speed step S24), receives the position of the slide shaft 32 from the non-contact measuring device 121 at a constant angular pitch and stores the obtained values in the memory 111 (step S25). The steps S24 and S25 are repeated until an end angle of the table 11 is reached (step S26). The pivoting angle of the table 11 is detected by the encoder 13.

Thus the data of a measured curve as shown in FIG. 27A are accumulated in the memory 111. When the detected pivoting angle reaches a predetermined end angle of the table 11, the computer 110 sends a drive signal to the nose feeding motor driver 114 to reverse the motor 46, thereby retracting the slide shaft 32 and separating the contact probe 38 from the work piece 1 (step S27). Then the computer 110 calculates the error value $\gamma(\theta)$ by subtracting the ideal curve D2 of the floppy disk 132 from the measured data D1 stored in the memory 111 at each angular pitch (step S28) and stores the results of said calculation in the floppy disk 112 (step S29).

Now reference is made to a flow chart in FIG. 30, for explaining an example of the function of the automatic programmer 133.

At first the computer 110 (or main computer 118) reads the error curve (measured data) from the floppy disk 112 through the floppy disk driver 119, and stores said data in the memory 111. It also reads the polishing amount curve from the floppy disk 113 and stores said data in the memory 111 (step S31).

Then the computer calculates the polishing time at each pivoting angle from said polishing amount data and said measured data (error curve) (step S32), then calculates the pivoting speed at each pivoting angle from the inverse of thus calculated polishing time (step S33), and stores the result of said calculation, as the work data, in the floppy disk 120 (step S34).

FIG. 31 shows an example of the control sequence of the polishing apparatus 135, but it will not be explained further as it is similar to the control sequence shown in FIG. 23.

In the above-explained embodiment, in order to remove projecting portions on the surface of the work piece 1 by polishing, the speed $V_2$ (pivoting speed in said embodiment) of the work piece 1 is controlled in inverse proportion to the amount of polishing while the speed $V_1$ of the lapping tape 39 is maintained constant, but the present invention is not limited by such embodiment. For example it is also possible to control the speed $V_1$ of the lapping tape 39 in proportion to the amount of polishing while maintaining the speed $V_2$ of the work piece 1 constant, or to combine both control methods.

H. Structure of pressurizing means

In the above-explained embodiment, the weight 33 is employed as means for applying a working pressure toward the work piece on the polishing tool of the polishing apparatus provided with polishing material feeding device, and, as shown in FIGS. 1 and 2, the slide shaft 32 having the polishing material feeding device 40 is statically supported by a pneumatic static bearing of the bearing box 31 and a constant pressure is given to the nose 38 by the weight 33 through the wire 36 of which an end is connected to the slide shaft 32. Consequently the pressure does not change by the movement of the slide shaft 32, as said pressure is generated by the weight 33. Also the nose 38 can very smoothly trace the surface of the work piece 1 to be polished since the slide shaft 32 is supported by static pressure. Besides a stable polishing operation can be achieved as the pressure of the lapping tape 39 on the work piece 1 is constant.

Also in case of use for measuring the amount of polishing as shown in FIG. 24, extremely precise data can be obtained by the reasons mentioned above.

The present invention is also naturally applicable to a grinding apparatus.

The above-explained embodiment allows one to utilize a polishing apparatus also as an apparatus for measuring the amount of polishing, by using a pressing member, for pressing a polishing tape to the surface of a work piece under a constant pressure, as a measuring probe for the measurement of amount of polishing by removing said polishing tape from said pressing member. It is therefore rendered possible to measure the work piece in an inexpensive and easy manner without the drawback of error in the setting of the work piece. Also the working time can be significantly reduced, as the correction polishing can be started immediately based on the measured data. Besides the process from the measurement to the correction polishing can be fully automated, thus significantly reducing the burden of operation and achieving a reduced manufacturing cost.

FIGS. 32 to 36 illustrate an embodiment having a rocking device in the polishing apparatus of tape feeding type shown in FIGS. 1 to 31.

Figure 32:
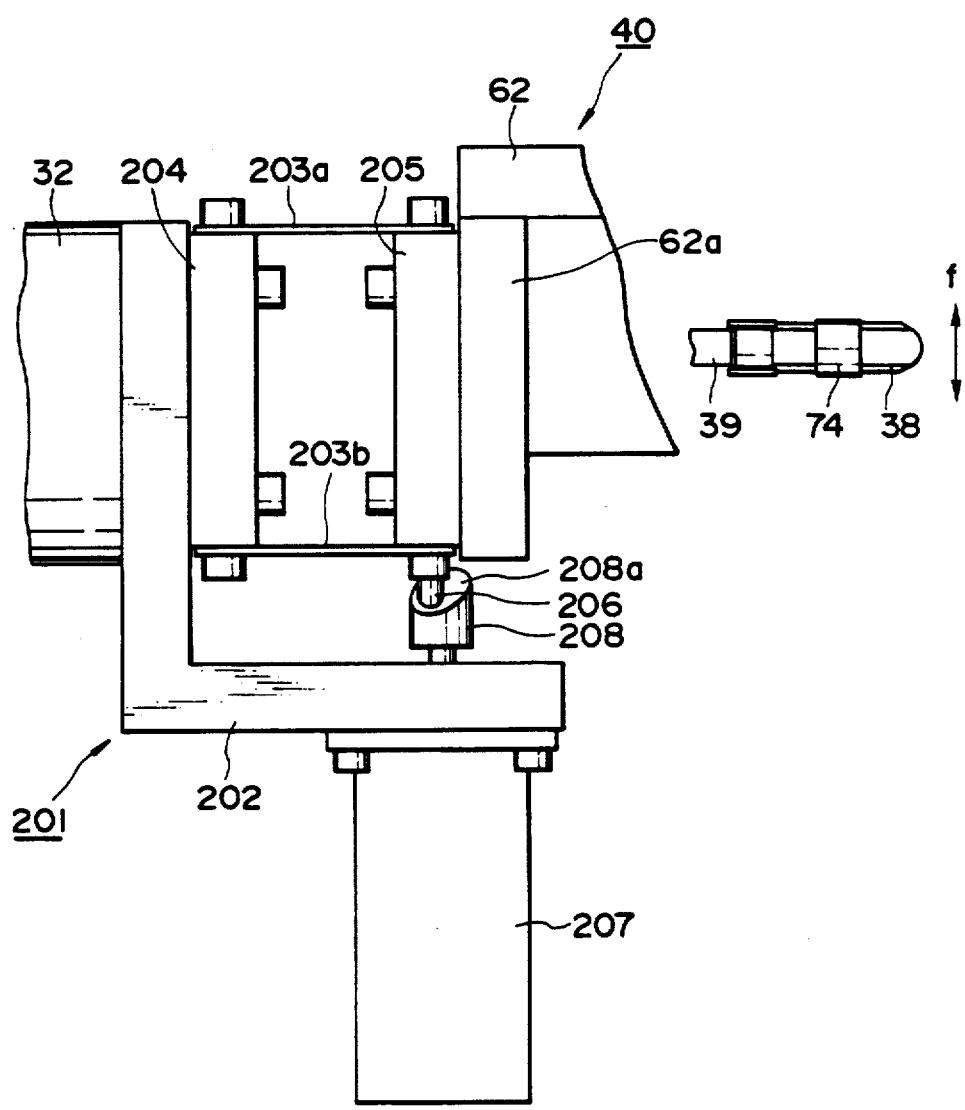
FIG. 32 is a plan view showing the structure of a rocking device shown in FIG. 1.

FIG. 32 shows a rocking device 201 to be incorporated in the apparatus shown in FIG. 1.

In FIG. 32 there are shown an L-shaped bracket 202; plate springs 203a, 203b; and plates 204, 205. Paired plate springs 203a, 203b are fixed by bolts on end faces of plates 204, 205 mutually spaced by a predetermined distance, and the plate 204 is fixed by bolts to the bracket 202.

There are further shown a plunger pin 206 mounted on an end of the other plate 205; a rocking motor 207 mounted on a lateral face of the bracket 202 in a direction substantially the same as that of the plunger pin 206; and a cylindrical cam 208 mounted on the shaft of said motor 207. A cam face 208a of said cylindrical cam 208 is maintained in contact with the end of the plunger pin 206, so that the rotation of the cylindrical cam 208 by the motor 207 causes a reciprocating or rocking motion, through the plunger pin 206, in the plate 205 in a direction perpendicular to the feeding direction of the lapping tape 39.

The bracket 202 of the above-explained rocking device 201 is fixed to the end face of the slide shaft 32, and the plate 205 is fixed, through a bracket plate 62a, to the bracket 62 of the polishing material feeding device 40. The nose 38, constituting the polishing tool, is mounted on the end of the bracket 62. Consequently the polishing material feeding device 40, including the nose 38, is connected, in rockable manner through the rocking device 201, to the slide shaft 32.

Thus the rotation of the cylindrical cam 208 by the motor 207 induces a rocking motion in the plate 205 through the plunger pin 206 maintained in contact with the cam face 208a, thereby causing the nose 38 to reciprocate in a direction f.

However, since the small projections 107 on the work piece 1 vary in size and location as shown in FIG. 21 in practice, so that it is necessary to measure the position and size of such projections 107 in advance, to bring the nose 38 to thus measured positions by moving the work piece 1 and to regulate the pressing period of the nose 38 according to the size of the projection 107.

Said movement of the work piece 1 can be achieved by regulating the pivoting angle of the table 11 by means of the motor 43, and the pressing period can be regulated by controlling the pivoting speed of the table 11. It is experimentally confirmed that the above-mentioned amount of polishing and the pivoting speed are mutually inversely proportional.

A polishing operation with rocking contact of the lapping tape 39 with the surface of the work piece 1 by means of the rocking device 201 can reduce the inclination of small steps formed on said surface in the polishing operation, thereby providing a satisfactorily polished surface.

If the lapping tape 39 is not given the rocking motion in the above-explained working principle, as shown in FIG. 33A, the polished area m of the work piece 1 generates a step h with a steep inclination S at the boundary. On the other hand, if the polishing operation is conducted with the rocking motion of the lapping tape 39, the inclination S' of the boundary becomes less steep as shown in FIG. 33B, so that the polished area m' and the unpolished area P are smoothly connected.

Figure 35:
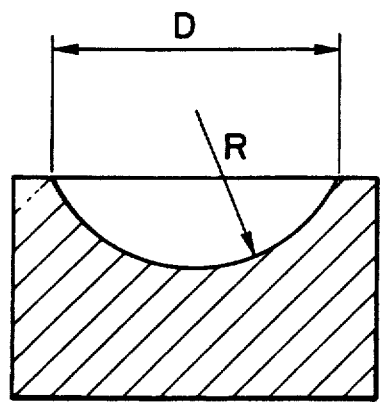
FIG. 35 is a cross-sectional view of a work piece showing an example of polishing with the rocking device.
Figure 36:
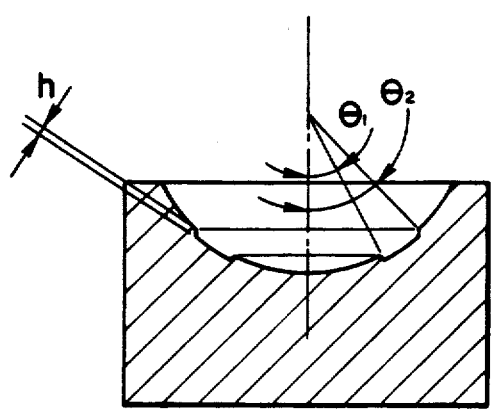
FIG. 36 is a cross-sectional view showing the polishing area of the work piece shown in FIG. 36.

The above-mentioned effect will be explained in further detail by actual examples. FIGS. 34A and 34B show interference patterns of the surface of the work piece 1 subjected to polishing operation, obtained when a spherical surface of the work piece 1 of a cross-section shown in FIG. 35 is polished to a form shown in FIG. 36 under the conditions shown in Table 1.

TABLE 1

|  | Work piece 1a | Work piece 1b |
|---|---|---|
| Rocking device | not used | used |
| Rocking amplitude |  | 0.15 mm |
| Rocking frequency |  | 108 cycles/min |
| Polished range ($\theta_1$–$\theta_2$) | 10°–20° | 5°–10° |
| Work piece revolution | 1000 rpm |  |
| Work pivoting speed | 0.049 deg/sec |  |
| Pressure | 50 gf |  |
| Nose end radius | 1 mm |  |
| Lapping tape | Polyester film (0.025 mm thick) coated with 1 μm diamond particles |  |
| Tape running speed | 0.5 mm/sec |  |
| Work piece material | Ultrahard alloy (WC) |  |
| Radius of curvature (R) | 3.6 mm |  |
| Aperture diameter D | 4.2 mm |  |

The FIG. 34A, which is a copy of the photograph of interference patterns of the work piece 1a polished without the rocking device 201 of the present embodiment, the polished area (m) and the unpolished area (p) show a clear boundary, indicating that the inclination S of said boundary is steep. On the other hand, in FIG. 34B, which is a copy of the photograph of interference patterns of the work piece 1b polished with the rocking device 201, the polished area (m) and the unpolished area (p) have an obscure boundary (s'), indicating that said areas are smoothly connected. The step h on the work piece 1 shown in FIGS. 34A, 34B is in the order of 0.02 μm.

I claim:

1. A polishing apparatus for polishing a work piece having a curved surface to be polished comprising:
   rotating means for holding the work piece and rotating the work piece around a rotational axis which is coincident with a center line of the curved surface;
   pivoting means for pivoting the curved surface of the work piece around a pivot axis which is perpendicular to the center line of the curved surface;
   supply means for supplying a polishing tape, said supply means comprising a polishing tape supply portion, a polishing tape winding portion, a pressing member for pressing the polishing tape onto the curved surface of the work piece, and applying means for applying a pressing force to said pressing member, wherein said pressing member presses the polishing tape onto the curved surface of the work piece, which rotates around the center line of the curved surface and pivots around the pivot axis, and said pressing member has a rounded portion of a predetermined curvature at one end thereof, and is adapted to feed, over said end, the tape running between said tape supply portion and said tape winding portion;
   measuring means for measuring a displacement of said pressing member;
   a detecting means for detecting the pivot angle of said pivot means;
   memory means for memorizing design data of the work piece; and
   a computer for controlling each said means, said computer determining the amount of work to be done on the work piece by a process wherein the polishing tape is detached from said pressing member of said polishing tape supply means and directly abuts said pressing member against the work piece, the pivot angle of said pivoting means is reset to an origin point, the work piece is pivoted by said pivoting means and displacement is measured by said measuring means, and an amount of correction work and a correction work position is determined by the measured data and the design data in said memory means.

2. A polishing apparatus according to claim 1, wherein said tape supply portion comprises a groove for guiding the tape on said end of said rod member.

3. A polishing apparatus according to claim 2, wherein said tape supply portion comprises a sleeve for guiding the tape on said rod member.

4. The polishing apparatus according to the claim 1, further comprising:
   reciprocating means for reciprocating said polishing tape in relation to the surface of the work piece to be polished.

5. A process of working a work piece by using a computer for controlling rotating means for rotating the work piece having a curved surface, pivoting means for pivoting the work piece, detecting means for detecting a pivot angle of the work piece, supply means supplying a polishing tape for polishing the curved surface of the work piece, and a memory for storing a correction program including pivot angle and pivoting means speed data, comprising:
   aligning a center of a radius of curvature of the curved surface of the work piece so as to be coincident with a pivot point of the pivoting means;
   pivoting the work piece by the pivoting means to a portion of the work piece to be corrected;
   actuating the rotating means and the polishing tape supply means;
   detecting data on the pivot angle by the detecting means;
   controlling the pivoting means to pivot the work piece by a pivot angle corresponding to the detected data;
   repeating the pivot angle detection until the pivot angle data read by the detecting means becomes a predetermined angle stored in the correction program; and
   terminating an operation of each means in response to detecting the pivot angle which is the predetermined angle.

6. A polishing apparatus for polishing a work piece having a curved surface to be polished comprising:
   rotating means for holding the work piece and rotating the work piece around a rotational axis which is coincident with a center line of the curved surface;

pivoting means for pivoting the curved surface of the work piece around a pivot axis which is perpendicular to the center line of the curved surface;

supply means for supplying a polishing tape, said supply means comprising a polishing tape supply portion, a polishing tape winding portion, and a pressing member for pressing the polishing tape onto the curved surface of the work piece;

measuring means for measuring an amount of the work piece polished, said measuring means utilizing said pressing member as a probe and contacting the polished surface of the rotating work piece to detect an amount of displacement of the probe and a rotational angle;

ideal curve data outputting means for outputting design data of the curved surface of the work piece;

calculation control means for calculating speed data in which each of the rotational speeds correspond to each of the rotational angles, on the basis of data from the measuring means and the ideal curve data outputting means; and a control computer for controlling the pivoting means on the basis of the data calculated by the calculation control means.

* * * * *

UNITED STATES PATENT AND TRADEMARK OFFICE
CERTIFICATE OF CORRECTION

PATENT NO. : 4,993,190          Page 1 of 2

DATED : February 19, 1991

INVENTOR(S) : Toyohiko Hiyoshi, et al.

It is certified that error appears in the above-identified patent and that said Letters Patent is hereby corrected as shown below: On the title page;

[30] Foreign Application Priority Data:

This information should read:

--[30]    Foreign Application Priority Data

| Mar. 19, 1987 | [JP] | Japan | 62-064801 |
| Mar. 19, 1987 | [JP] | Japan | 62-064802 |
| Mar. 19, 1987 | [JP] | Japan | 62-064803 |
| Mar. 19, 1987 | [JP] | Japan | 62-064804 |
| Mar. 19, 1987 | [JP] | Japan | 62-064805 |
| Mar. 19, 1987 | [JP] | Japan | 62-064806 |
| Mar. 19, 1987 | [JP] | Japan | 62-064810 |
| Feb. 10, 1988 | [JP] | Japan | 63-027662-- |

[56] References Cited:

Under "U.S. PATENT DOCUMENTS",

"4,671,018   6/1989   Ekhoff" should read
    --4,671,018   6/1988   Ekhoff--.

COLUMN 2:

Line 57, "$" should be deleted.

UNITED STATES PATENT AND TRADEMARK OFFICE
CERTIFICATE OF CORRECTION

PATENT NO. : 4,993,190

DATED : February 19, 1991

INVENTOR(S) : Toyohiko Hiyoshi, et al.

It is certified that error appears in the above-identified patent and that said Letters Patent is hereby corrected as shown below:

COLUMN 8:

Line 30, "to be" should be deleted.

Signed and Sealed this

First Day of December, 1992

Attest:

DOUGLAS B. COMER

Attesting Officer

Acting Commissioner of Patents and Trademarks